No. 789,409. PATENTED MAY 9, 1905.
F. M. CARROLL.
COMPUTING MACHINE.
APPLICATION FILED JUNE 14, 1904.

19 SHEETS—SHEET 1.

Witnesses:
Frank S. Ober
L. Vreeland

Fred M. Carroll Inventor:
By his Attorneys Bartlett, Brownell & Mitchell

No. 789,409. PATENTED MAY 9, 1905.
F. M. CARROLL.
COMPUTING MACHINE.
APPLICATION FILED JUNE 14, 1904.

19 SHEETS—SHEET 3.

WITNESSES
Chas. A. Peard
L. Vreeland

FRED M. CARROLL INVENTOR
Bartlett Brownell
BY HIS ATTORNEYS Mitchell

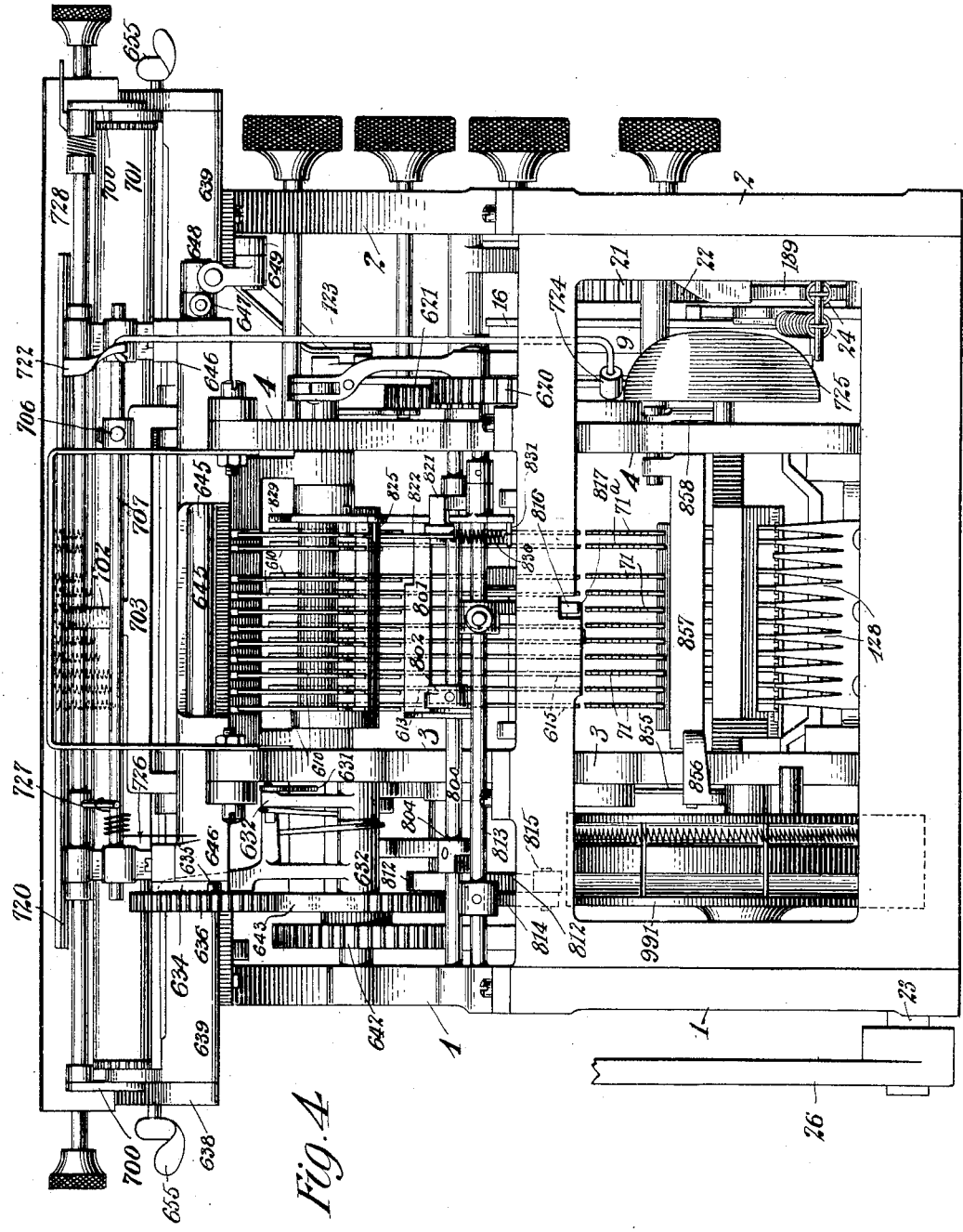

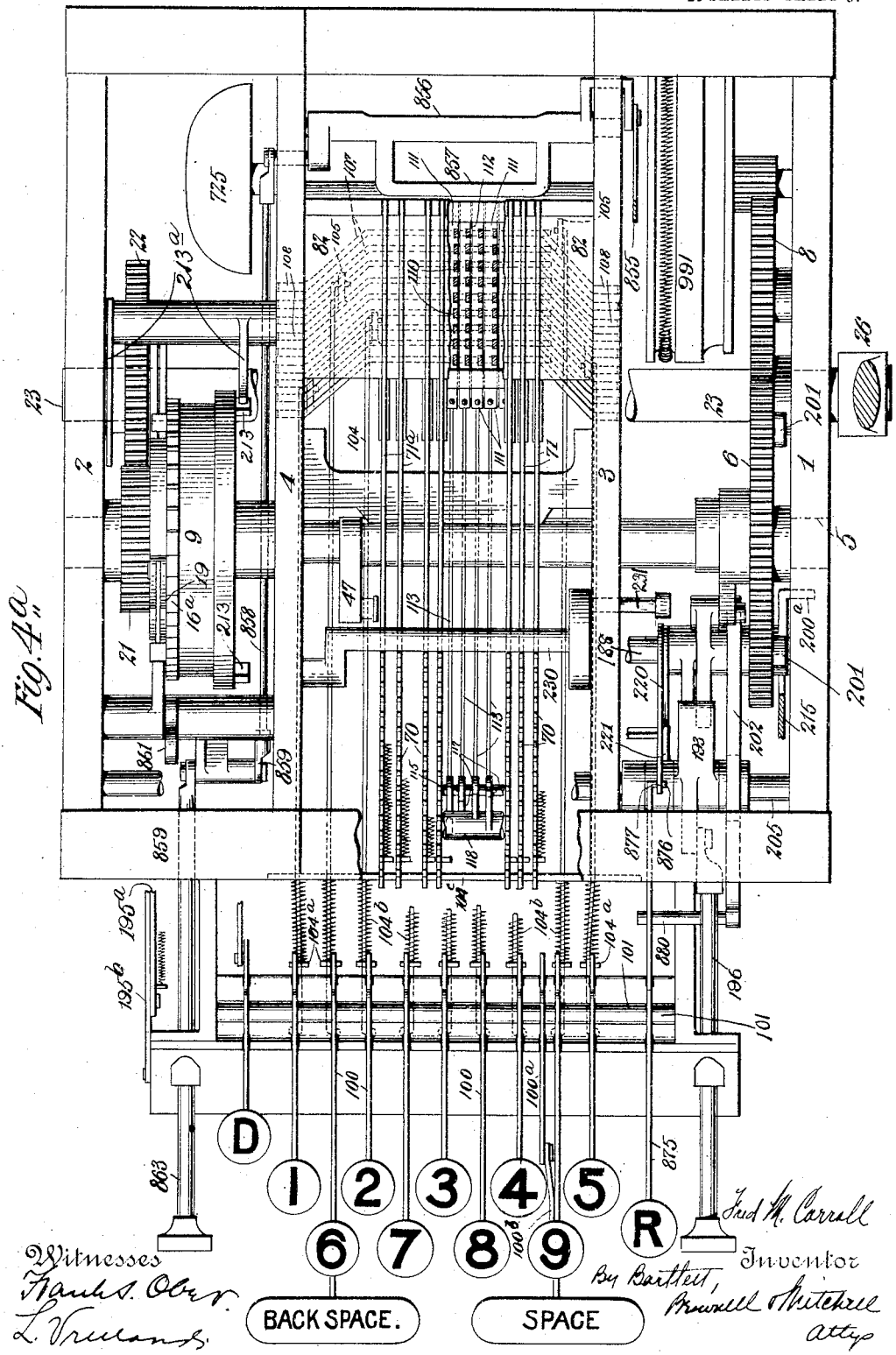

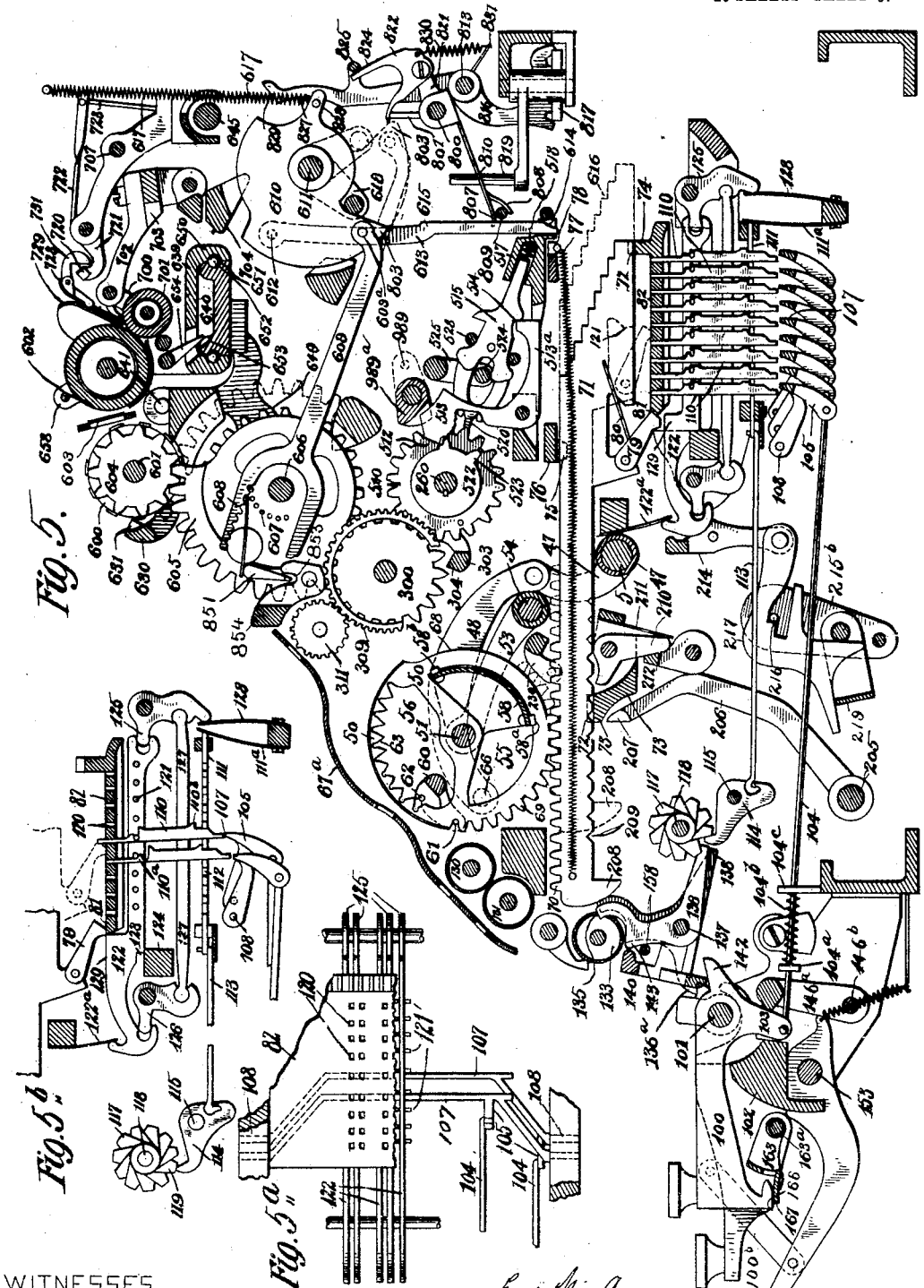

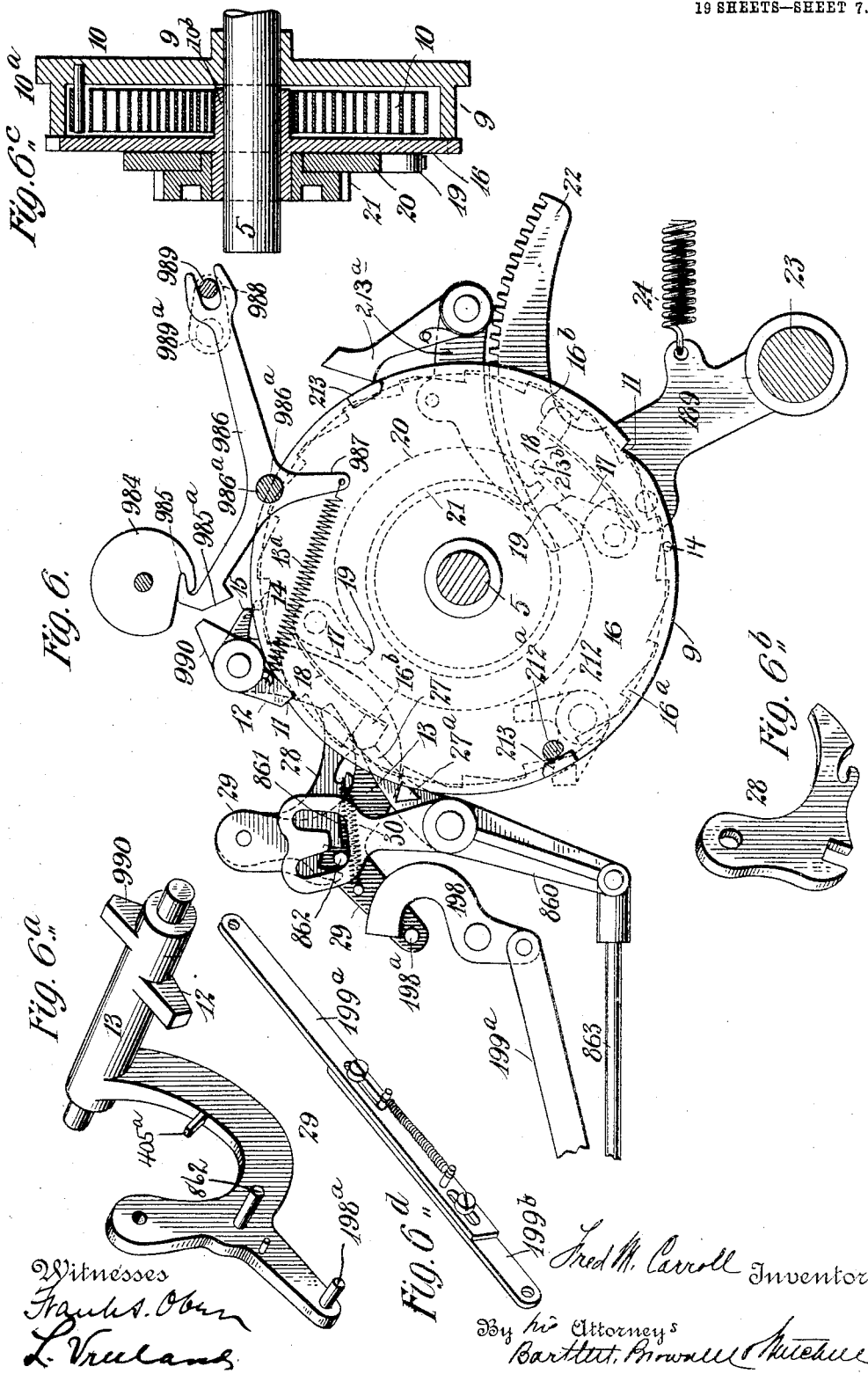

No. 789,409. PATENTED MAY 9, 1905.
F. M. CARROLL.
COMPUTING MACHINE.
APPLICATION FILED JUNE 14, 1904.
19 SHEETS—SHEET 8.
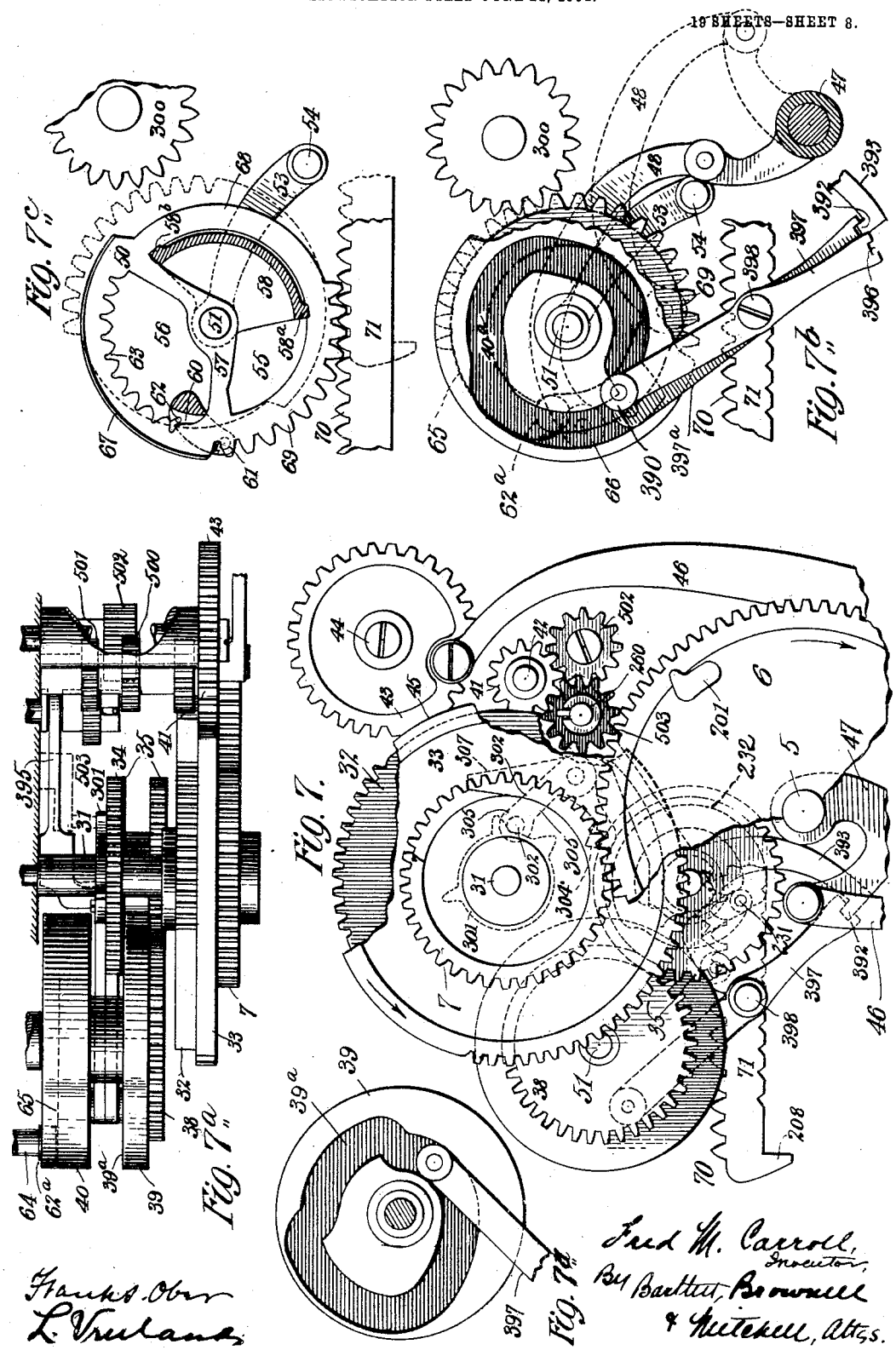

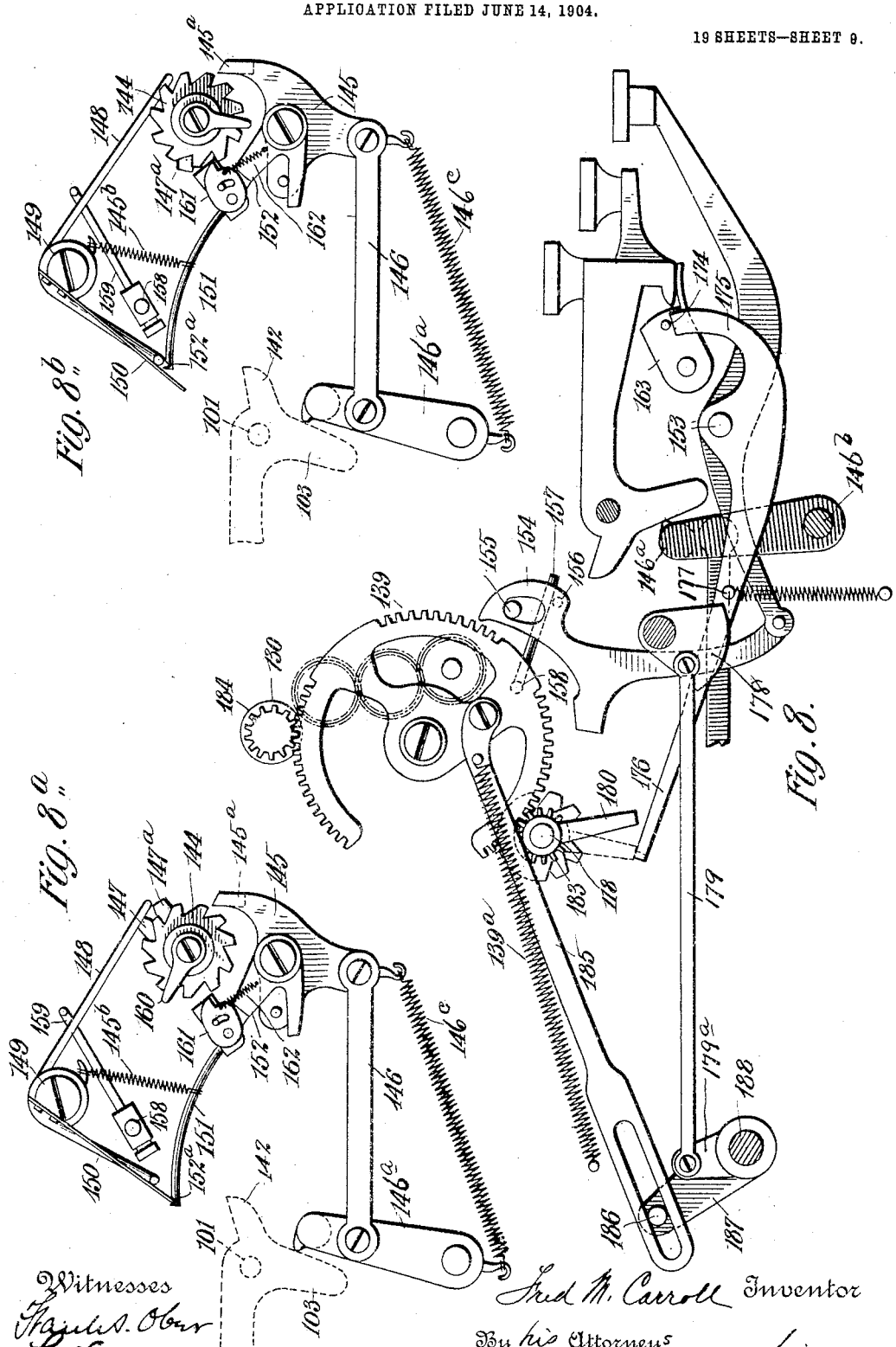

No. 789,409. PATENTED MAY 9, 1905.
F. M. CARROLL.
COMPUTING MACHINE.
APPLICATION FILED JUNE 14, 1904.
19 SHEETS—SHEET 10.
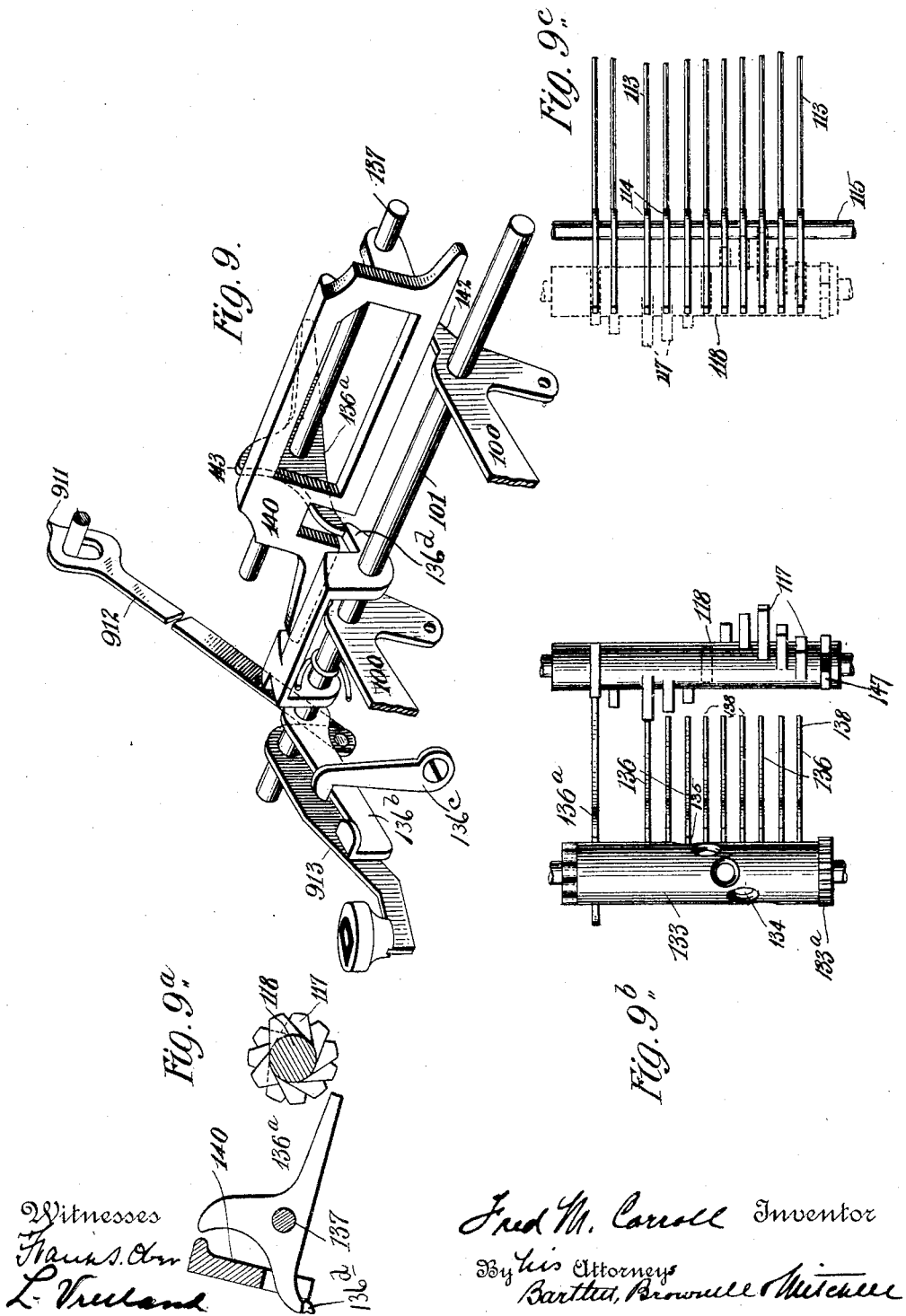

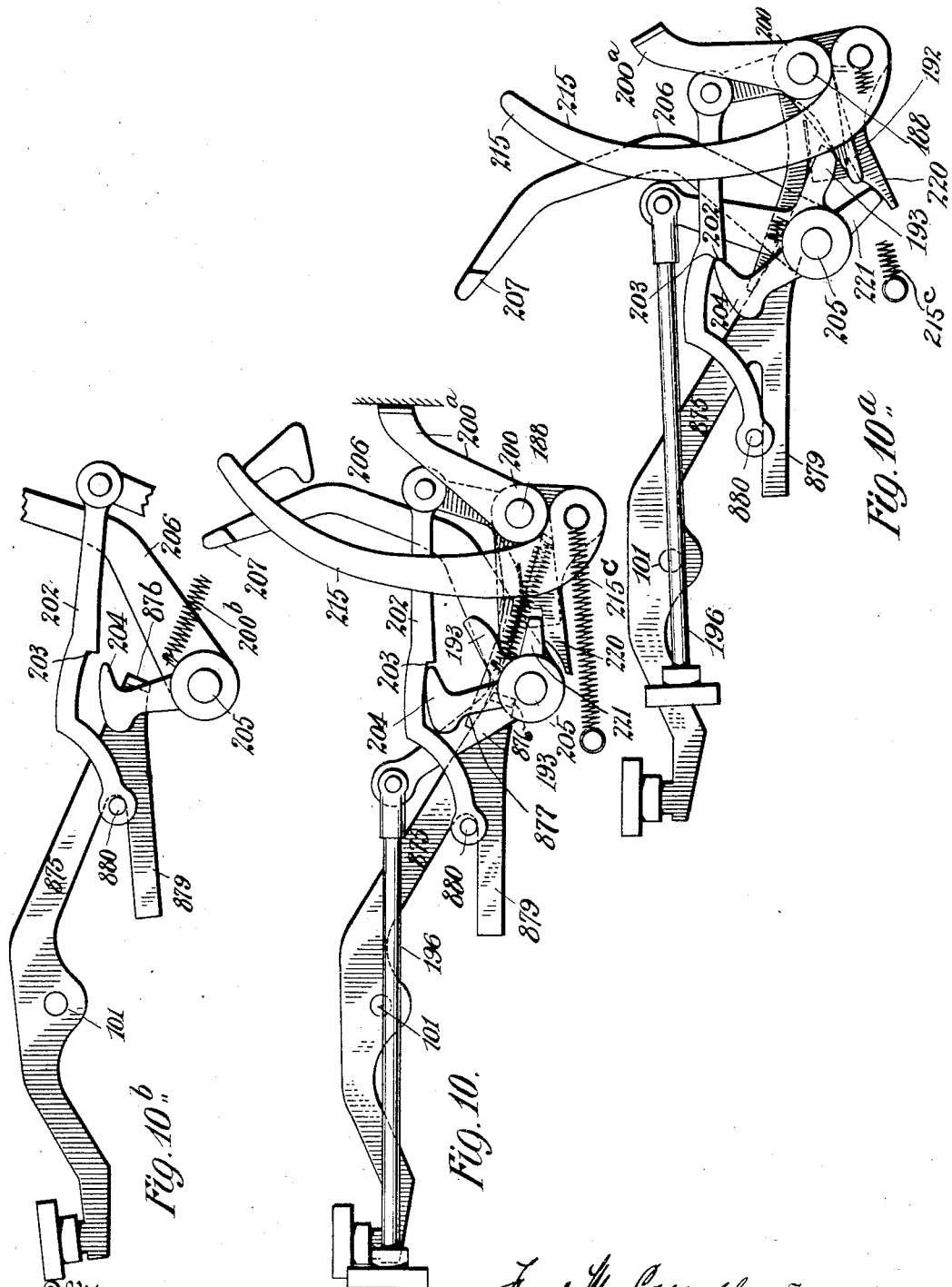

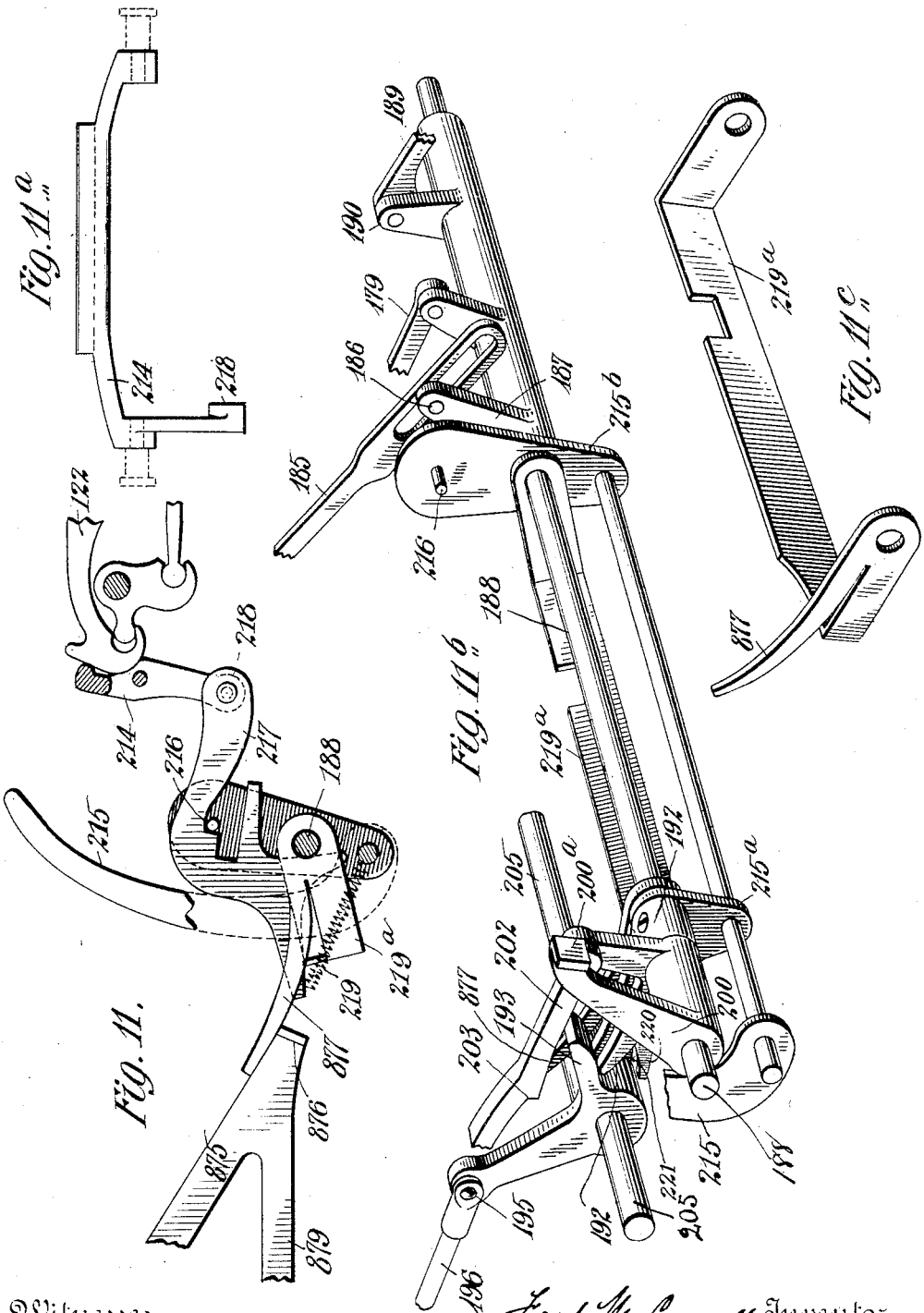

No. 789,409. PATENTED MAY 9, 1905.
F. M. CARROLL.
COMPUTING MACHINE.
APPLICATION FILED JUNE 14, 1904.
19 SHEETS—SHEET 13.
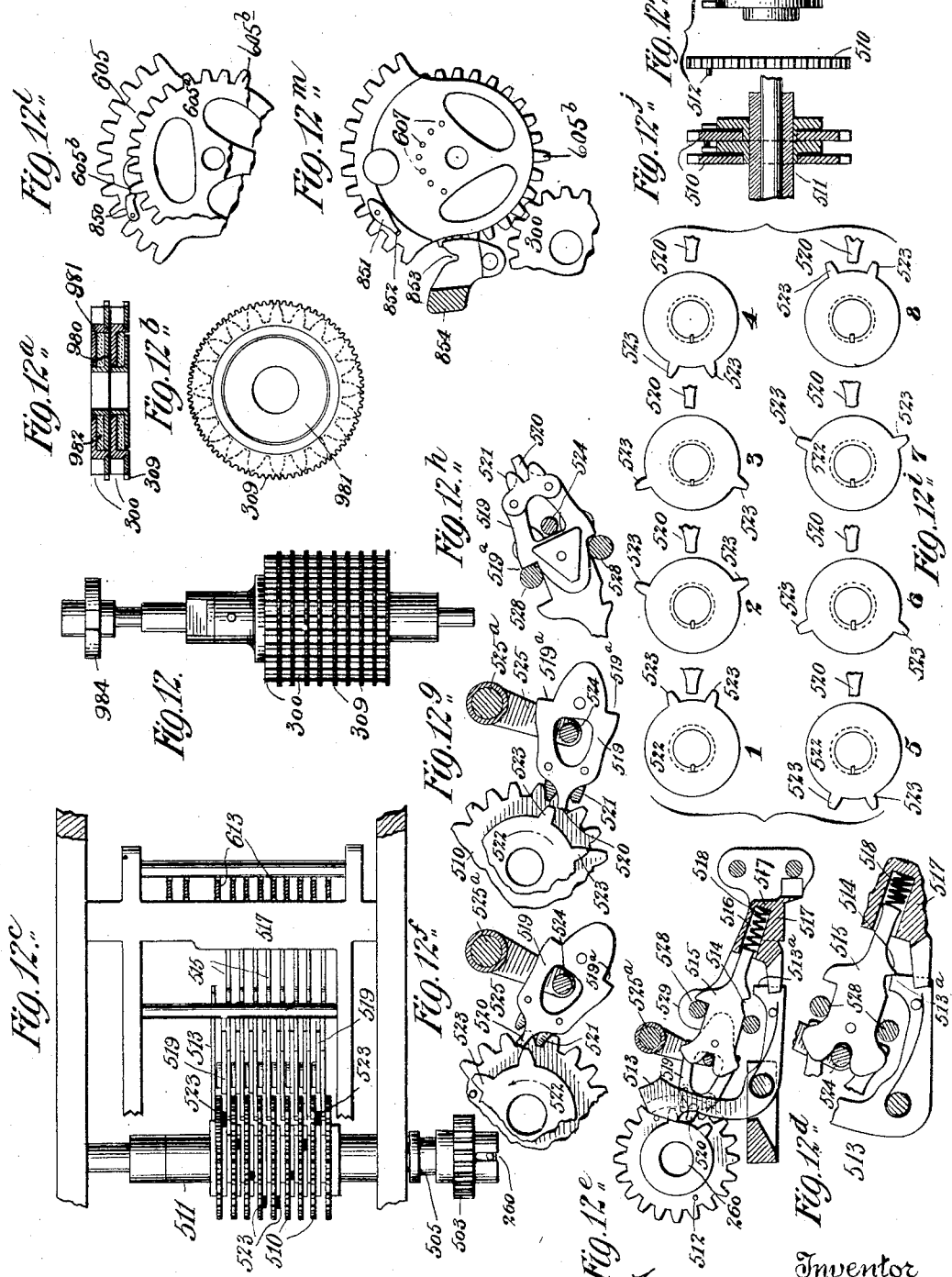
Witnesses
Inventor
Fred M. Carroll
By his Attorneys
Bartlett, Brownell & Mitchell

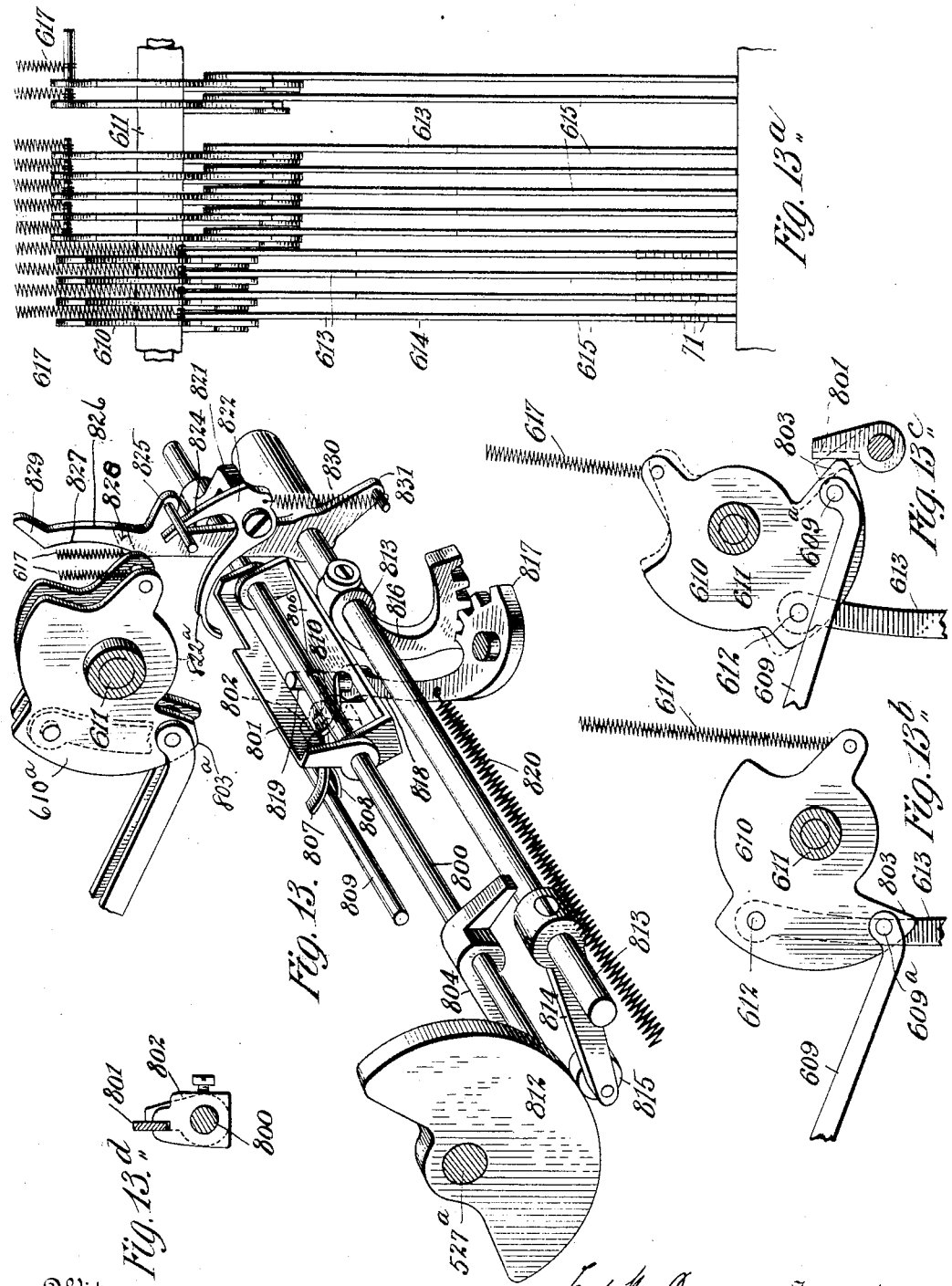

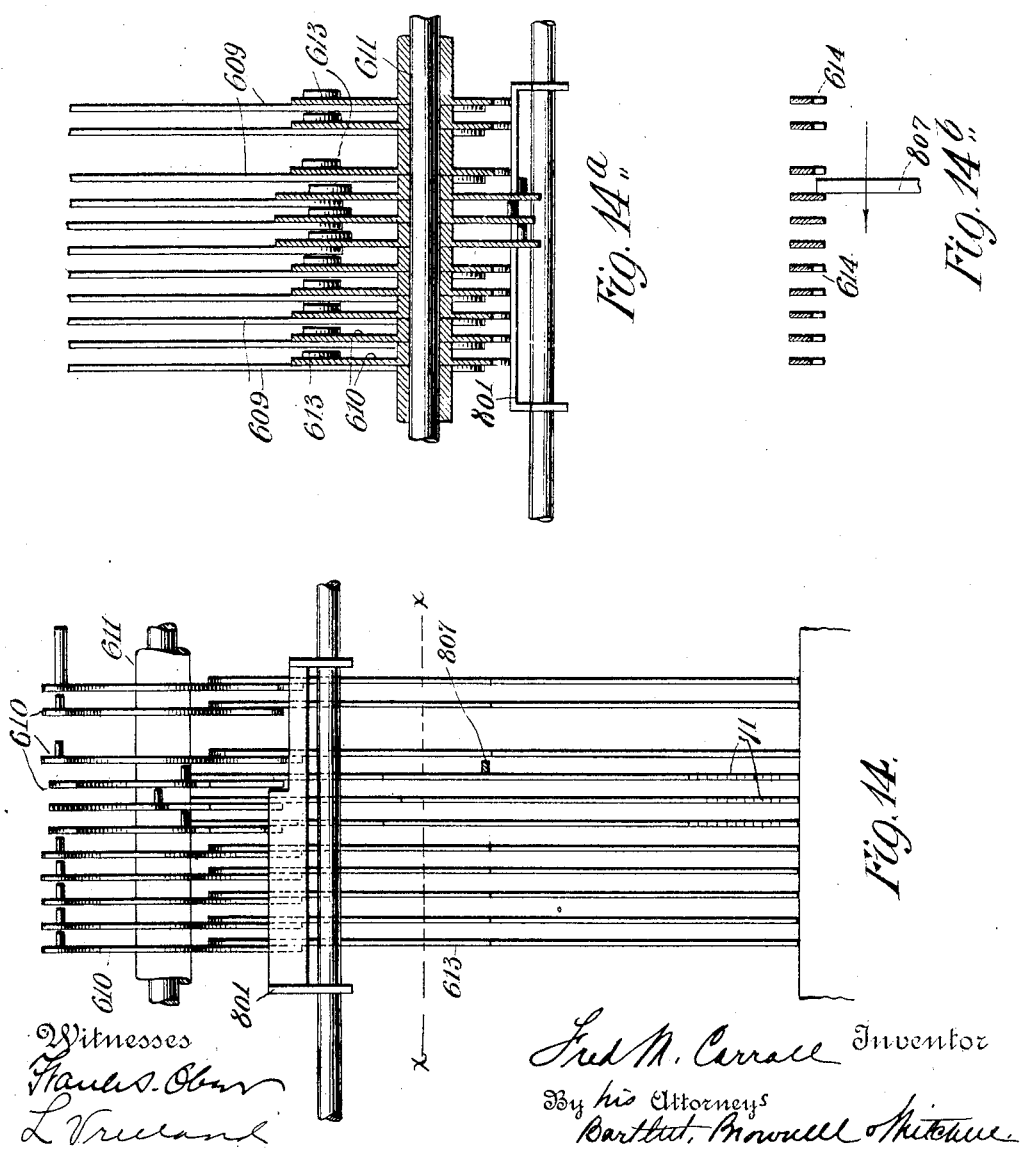

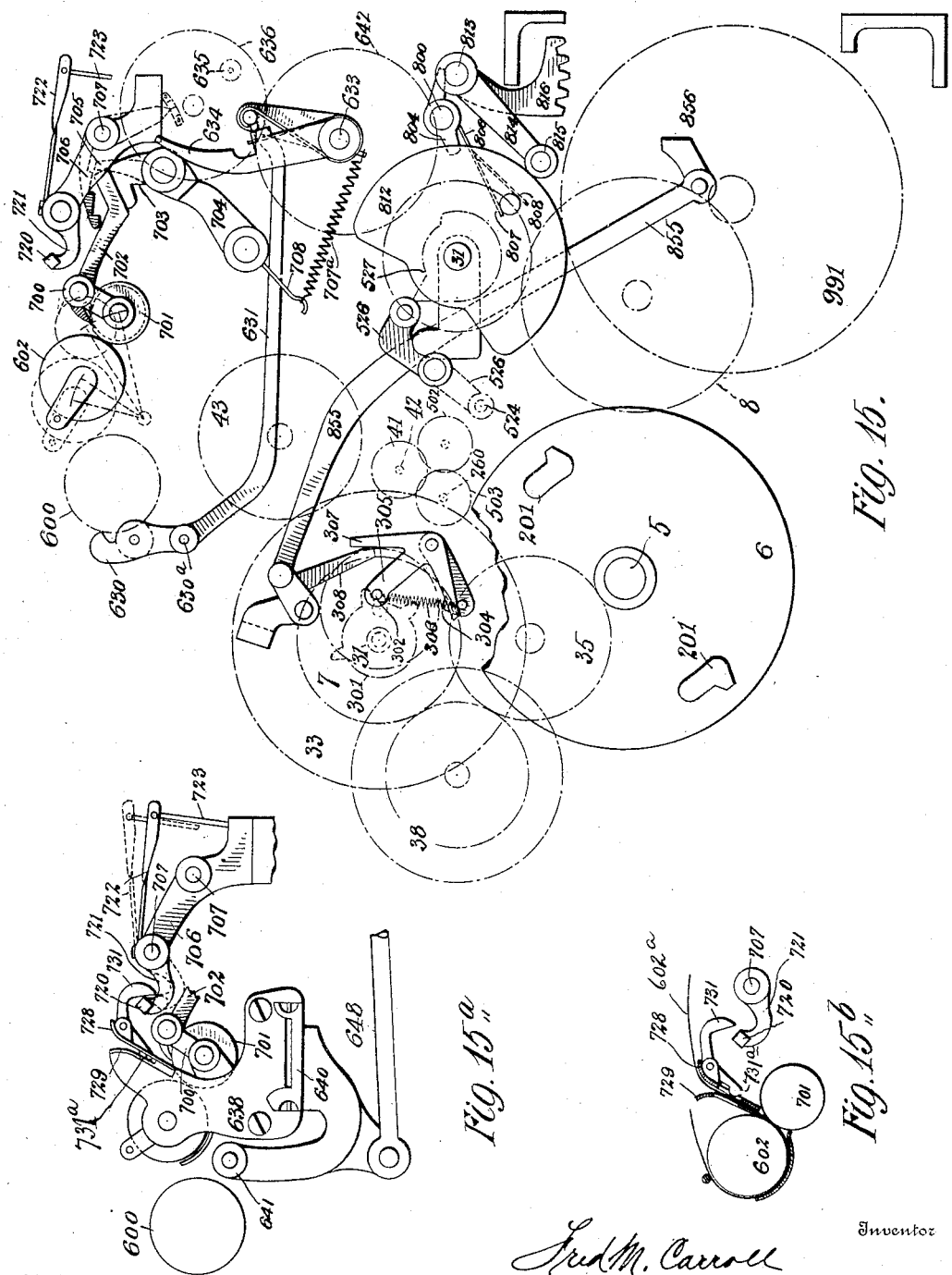

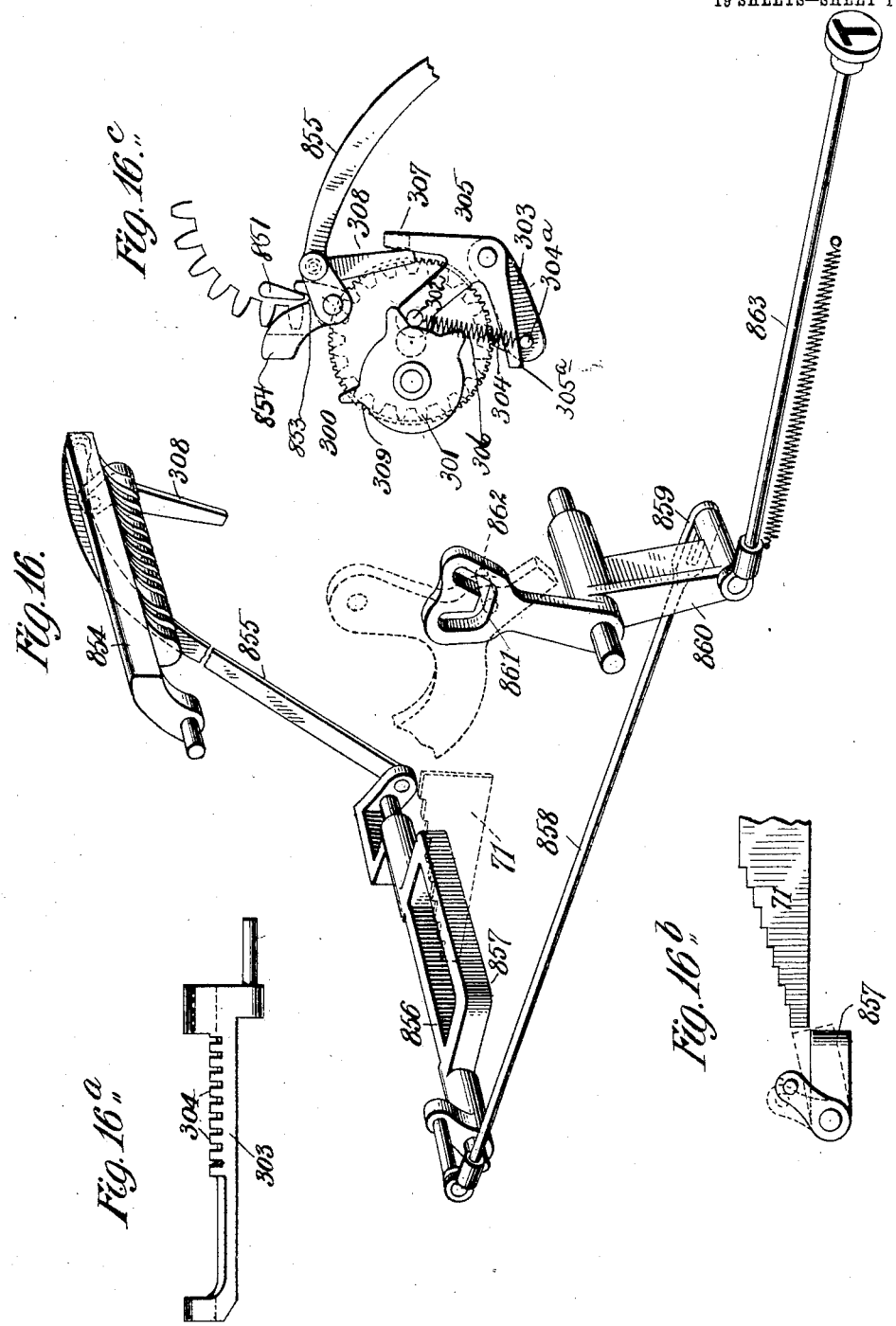

No. 789,409. PATENTED MAY 9, 1905.
F. M. CARROLL.
COMPUTING MACHINE.
APPLICATION FILED JUNE 14, 1904.
19 SHEETS—SHEET 18.
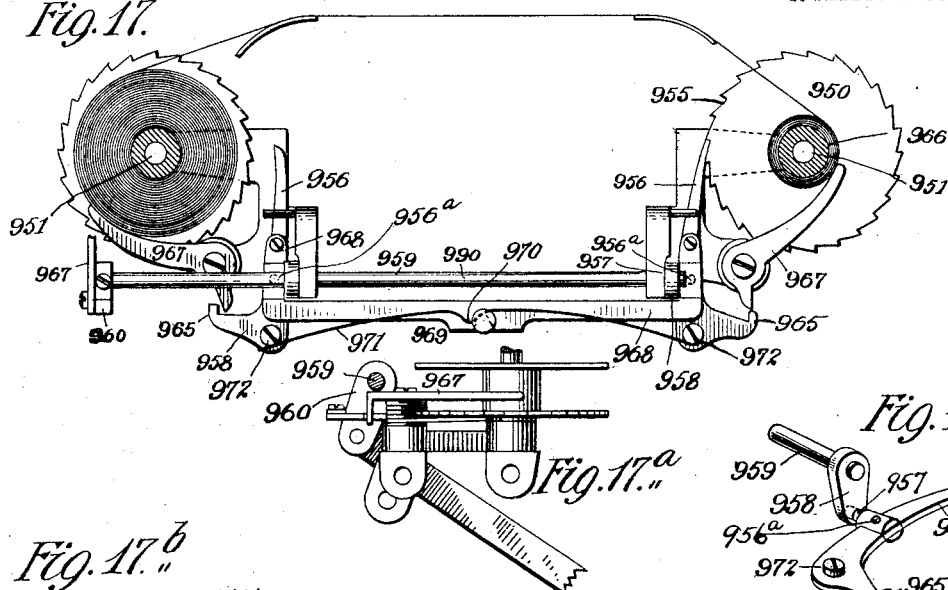
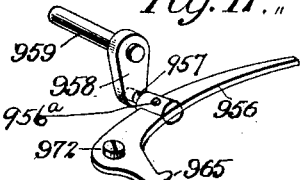
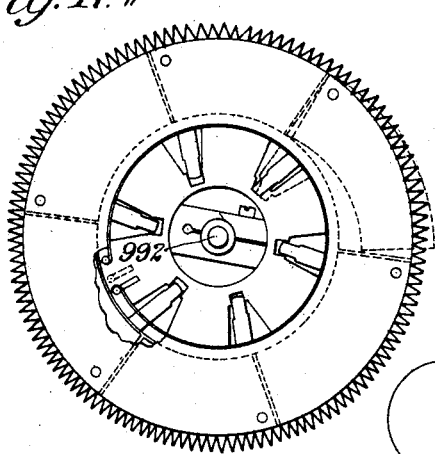
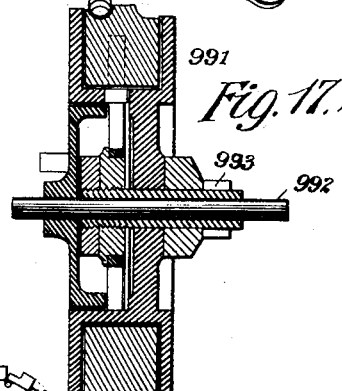
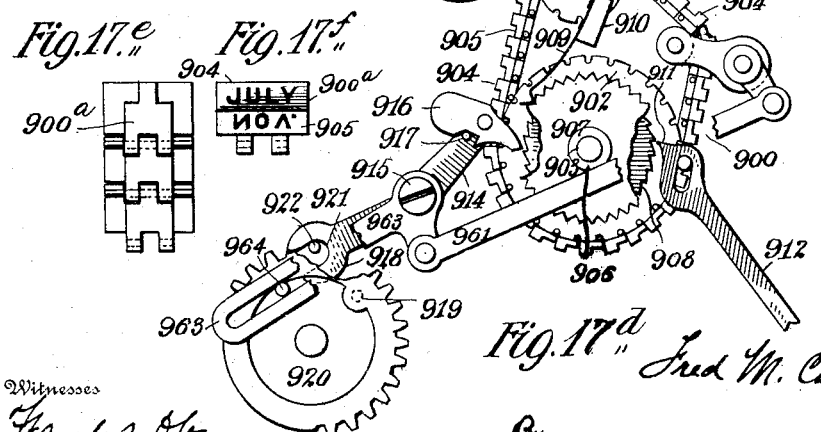

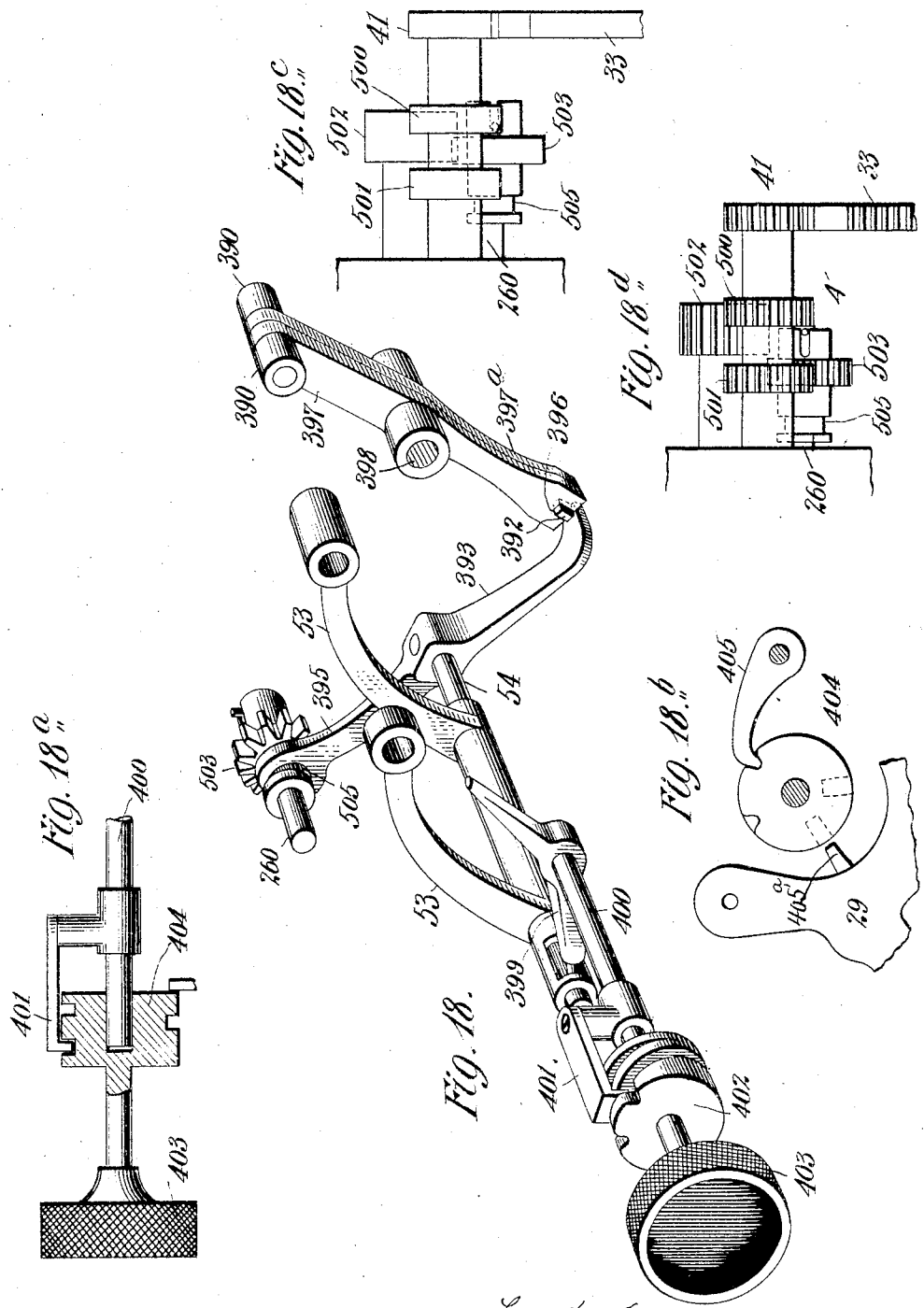

No. 789,409. Patented May 9, 1905.

UNITED STATES PATENT OFFICE.

FRED M. CARROLL, OF NEW HAVEN, CONNECTICUT, ASSIGNOR TO EDWARD S. SWIFT, TRUSTEE, OF NEW HAVEN, CONNECTICUT.

COMPUTING-MACHINE.

SPECIFICATION forming part of Letters Patent No. 789,409, dated May 9, 1905.

Application filed June 14, 1904. Serial No. 212,700.

*To all whom it may concern:*

Be it known that I, FRED M. CARROLL, a citizen of the United States, residing at New Haven, county of New Haven, State of Connecticut, have invented certain new and useful Improvements in Computing-Machines, of which the following is a full, clear, and exact description.

My invention relates to an improved computing and printing machine, the object being to produce a machine possessing increased accuracy in performance, uniformity of action, and increased speed and capacity; and it consists of certain features of construction and combination hereinafter described, and particularly referred to in the claims.

The machine shown and described in this application as embodying my invention is designed to be used for adding and subtracting, printing items, printing totals, and printing dates. In some embodiments of my invention, however, the printing mechanism may be omitted, also the features which provide for subtraction, although adding-machines are preferably adapted for subtraction as well as addition.

This machine also embodies certain features already shown and described in my pending application, Serial No. 51,765, filed March 18, 1901, but in an improved arrangement and combination, as will be hereinafter explained.

The following is a description of my invention, reference being had to the accompanying drawings, in which—

Figure 1:
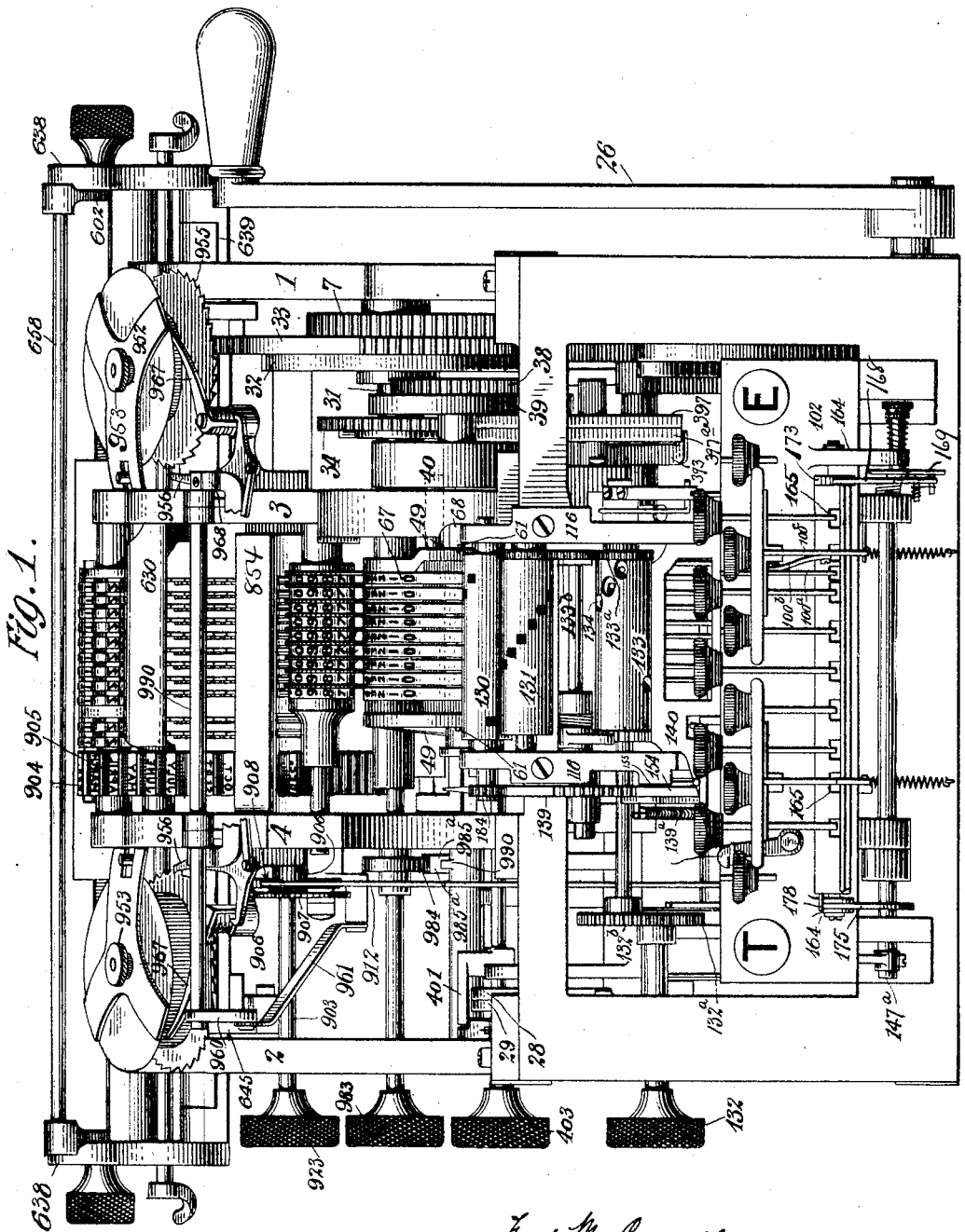
Figure 2:
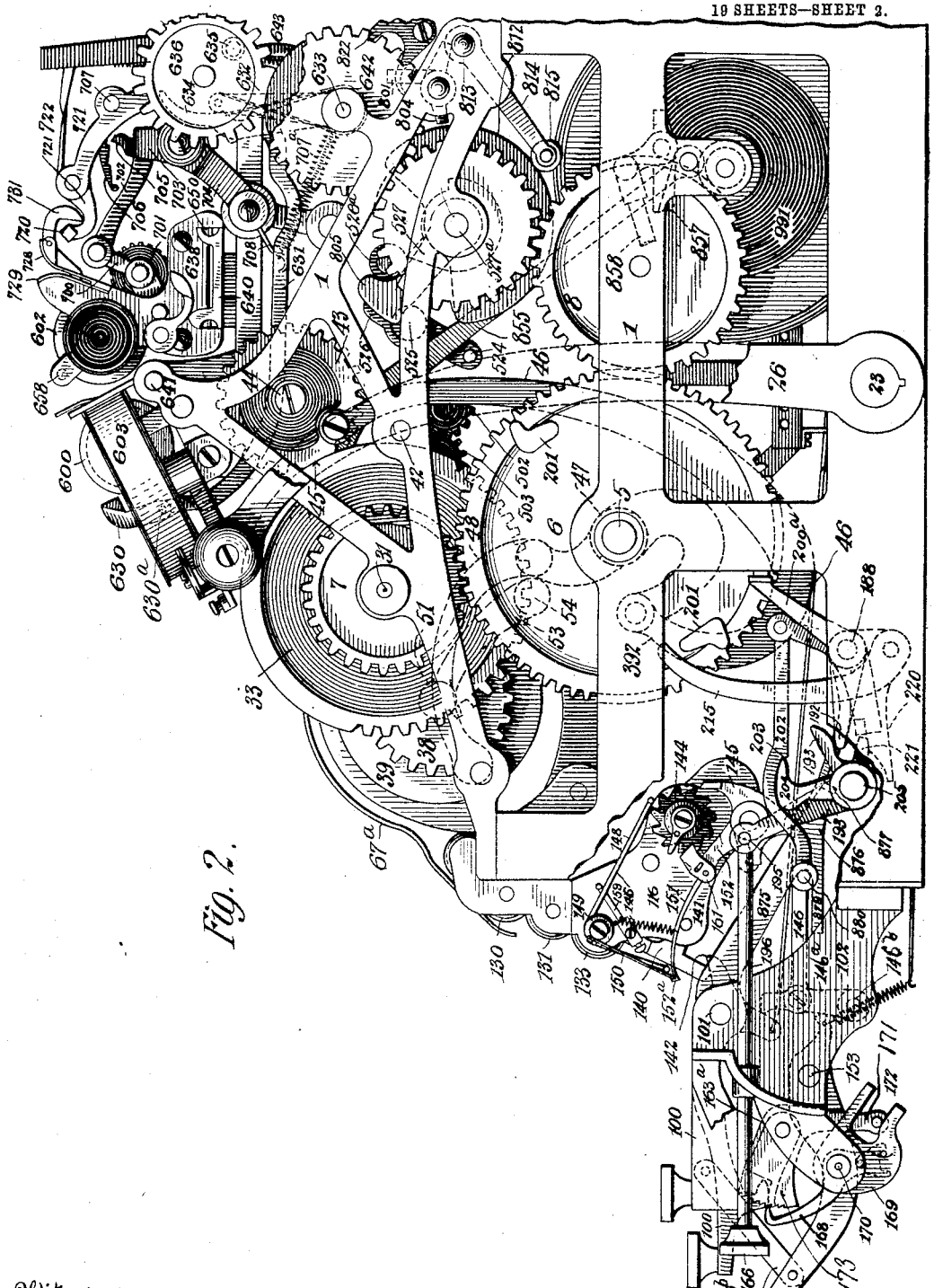
Figure 3:
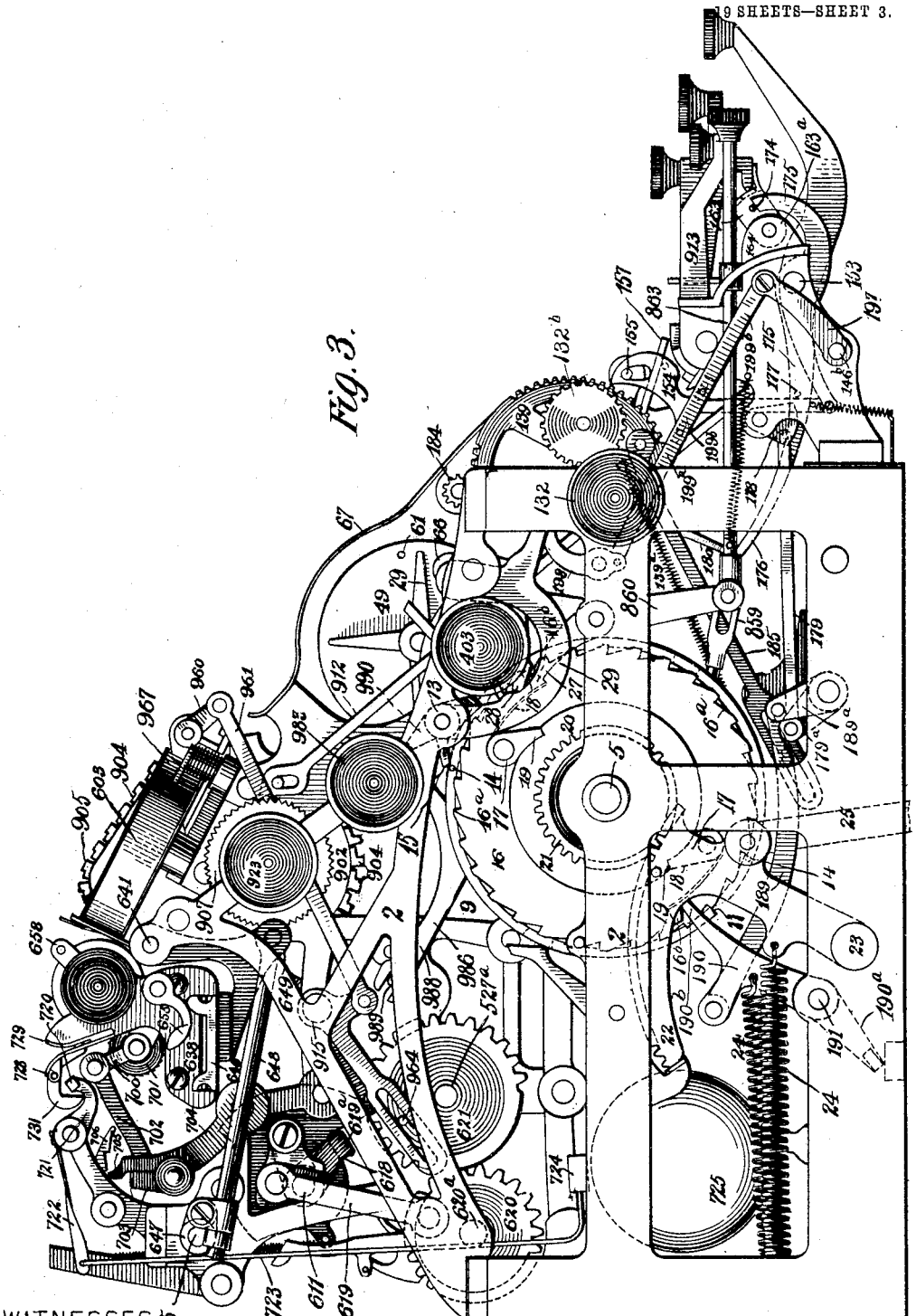

Figure 1 is a front elevation of a machine embodying my invention. Fig. 2 is a right-hand elevation of the same. Fig. 3 is a left-hand elevation of the same. Fig. 4 is a back elevation. Fig. $4^a$ is a plan view with the upper parts removed. Fig. 5 is a longitudinal section showing the arrangement of various parts. Fig. $5^a$ is a plan view of parts of the vertical stop mechanism. Fig. $5^b$ is a side elevation of that mechanism, partly in section. Fig. 6 is a view of the spring-drum, controller, winding-segment, and associated parts looking from the right. Fig. $6^a$ is a detail of the controller. Fig. $6^b$ is a pivoted tripping-plate on the controller. Fig. $6^c$ is a section of the spring-drum. Fig. $6^d$ is a detail of a connecting-link. Fig. 7 is a right-hand view of the distributing counter-shaft and associated gearing. Fig. $7^a$ is a plan view of the same. Fig. $7^b$ is a view of the item-segment cradle-lifting mechanism. Fig. $7^c$ is a view showing the relation of the rack-bars, item-segments, and accumulating-wheels. Fig. $7^d$ is a view of the right-hand cradle-lifting cam. Fig. 8 is a detail view showing the relation of the selector-shaft, the indicator-cylinders, the back spacing-key, and other details. Figs. $8^a$ and $8^b$ are details showing the step-by-step mechanism of the selector-shaft in different positions. Fig. 9 is a perspective view showing the word-key and the date-controlling key and associated mechanism. Fig. $9^a$ is a detail showing connections between the date-controlling mechanism and the selector-shaft. Fig. $9^b$ is a detailed view showing the relations between the stationary column-indicator, the selector-shaft, and the coacting dogs. Fig. $9^c$ is a view showing the selector-shaft and stop-shifting rods. Fig. 10 is a view showing details of the repeating and erasing mechanisms. Fig. $10^a$ shows the parts of Fig. 10 in different relations. Fig. $10^b$ shows the position of certain of the parts when the repeat-key is depressed. Fig. 11 shows the connection between the stop-releasing mechanism and its actuating parts. Fig. $11^a$ shows a detail of the resetting-yoke of the stop-releasing mechanism. Figs. $11^b$ and $11^c$ show in perspective details of the stop-releasing mechanism. Fig. 12 is a plan view of the accumulator-wheels. Fig. $12^a$ is a sectional view of two of said wheels. Fig. $12^b$ is a side elevation of the same. Fig. $12^c$ is a plan view of the carrying-wheels and certain coöperating parts. Figs. $12^d$, $12^e$, $12^f$, $12^g$, $12^h$, $12^i$, $12^j$, $12^k$ show certain details of the carrying mechanism. Figs. $12^l$ and $12^m$ show details of the total-printing mechanism. Fig. 13 shows in perspective details of the zero-printing mechanism. Fig. $13^a$ shows a rear elevation of the plungers and rack-bars with which the zero-printing mechanism coöperates. Fig. $13^b$ shows a rocking plate in elevated position. Fig. $13^c$ shows a rocking plate in depressed position about to be actuated by the cipher-lifting yoke-plate. Fig. 13$^d$ shows a detail of the guide for the sliding lever. Fig. 14 shows a detail of the cipher-lifting yoke-plate coöperating with the plungers. Fig. 14$^a$ is a horizontal sectional view of the same through the shaft of the rock-plates. Fig. 14$^b$ is a section on the line $x$ $x$ of Fig. 14. Fig. 15 is a diagrammatic view of parts looking from the left-hand end of the machine, showing their operative relations. Fig. 15$^a$ is a detail view of the tilting printing-platen, alarm mechanism, and other associated parts. Fig. 15$^b$ shows the alarm-trip retracted by the paper. Fig. 16 shows the relation of the totalizing-key, operating-levers, and interlocks controlled thereby. Fig. 16$^a$ is a front view of an alining device operated by the totalizing-key. Fig. 16$^b$ is a side elevation showing in detail the relations of the rack-bars and the totalizing-key rack-bar interlock. Fig. 16$^c$ is a detail showing means for bringing the parts into proper relation for total-printing and other associated details. Fig. 17 shows a plan view of the ribbon-feed mechanism. Fig. 17$^a$ is a horizontal view of a detail of the same. Fig. 17$^b$ is a side elevation showing the centrifugal governor. Fig. 17$^c$ is a sectional view of the same. Fig. 17$^d$ shows the mechanism for operating a word-printing chain. Fig. 17$^e$ is the rear view of a part of the chain. Fig. 17$^f$ is a front view of a single link of a chain. Fig. 17$^g$ is a detail of the ribbon-feed. Fig. 18 is a perspective view of the mechanism for setting the machine for addition or subtraction. Fig. 18$^a$ is a detail of the same. Fig. 18$^b$ shows an interlock relation btween the addition and subtraction controlling device and the main controller. Fig. 18$^c$ shows the gears for shifting the gears for operating the carrying-wheels into position for subtracting. Fig. 18$^d$ shows the same gears shifted into the position for adding.

Referring more particularly to the drawings as shown, there are a set of numeral-keys 1, 2, 3, 4, 5, 6, 7, 8, and 9, Figs. 1, 2, 3, 4$^a$, 5, which are used in setting up the items. There are also two lower keys, the right-hand one being a "forward" space-key and also serving as a zero-key, while the left-hand one is a "back" space-key, Figs. 1, 4$^a$. There is also a repeating-key R, to be used to repeat the same item a number of times, an erasing or resetting key E, and a totalizing-key T, and a word or date key D, the functions of all of which will be described in detail. Suffice it to say for the present that after the keys have been properly operated and the machine tripped corresponding items will be set up on the type-wheels and printed and that when desired the sum of or difference between these items can also be set up on the type-wheels and printed.

Referring now to the mechanism, 1 2 are the right and left outside members of the frame of the machine, and 3 and 4 are the right and left inside members of the frame, Figs. 1, 4, and 4$^a$. In the outside members 1 and 2 is mounted a driving-shaft 5, having upon its right-hand end a main driving-gear 6, with which engage the gears 7 and 8 for transmitting motion to different parts of the machine for various purposes to be hereinafter described.

The main driving-shaft 5 carries upon its left-hand end a spring casing or drum 9, containing the mainspring 10 and having upon a flange in its periphery two opposite notches 11 and 11, with which a projection 12, Fig. 6, on the controller 13 engages. This controller 13 has one end mounted in the left-hand outside frame 2, and its other end is mounted in the left-hand inner frame 4 and is normally held in contact with the drum by a spring 13$^a$, as hereinafter described. When the controller 13 is moved so as to withdraw the projection 12 from one end of the notches 11 upon the spring-drum, the spring 10 causes the main shaft 5 to revolve until the projection 12 engages with the other notch 11. A pin 14, Figs. 3 and 6, upon the spring-casing engages with a rearwardly-projecting arm 15 upon the controller-shaft at such a time as to positively force the projection 12 downward, so as to cause it to engage with the next succeeding notch 11. The spring 10 within the casing has its outer end secured to the spring-casing by a pin 10$^a$ and its inner end connected with an inwardly-projecting boss 10$^b$ upon the drum-head 16. This drum-head carries two pawls 17 17, which by means of springs 18 engage with notches 19 19 upon a movable ratchet-wheel 20, also mounted upon the shaft 5. This movable ratchet-wheel is formed with a gear 21, with which meshes a curved rack 22, mounted upon the shaft 23, which is journaled in the two outside members of the frame. The rack 22 is retracted to its normal position by a spring 24. It has also depending from it a link 25 for engagement with the treadle when the machine is to be operated by foot. The rack 22 is rigidly attached to the shaft 23, to the right-hand end of which is connected an operating-handle 26. In practice either the operating-handle or the treadle connection may be omitted. The drum-head 16 has upon it ratchet-teeth 16$^a$, engaged by a laterally-projecting stud 27$^a$ on a pawl 27, which at a partial throw of the rack 22 prevents the drum-head from turning backward. It also carries two lugs 16$^b$, which upon the complete throw of the curved rack 22 engage with the end of the pawl 27 to hold the drum-head in position. As soon as the curved rack 22 is released it is at once retracted by the spring 24. After a complete movement has been made and the curved rack 22 has been retracted the next forward movement of the curved rack first causes one of the lugs 16$^b$ of the drum-head to engage and lift the tripping-plate 28, which is pivoted to the end of the curved arm 29, carried by the controller 13. A further movement of the curved rack 22, resulting in a further movement of the lug 16$^b$, moves the controller, so as to release the projection 12 from the notch 11 of the spring-drum, permitting the drum to revolve under the action of the mainspring. The tripping-plate 28 is retracted by a spring 30, and the parts are so proportioned that as soon as the lug 16$^b$ has moved sufficiently to cause the tripping-plate to move the controller, so as to release the projection 12 from the notch 11, the point of the tripping-plate will escape the lug 16$^b$, so that it cannot again be engaged thereby so as to again trip the controller until the handle 26 has been actuated sufficiently to fully rewind the mainspring and cause the next lug 16$^b$ to engage the lower side of the tripping-plate 28. (See Figs. 3 and 6.)

The gear 7 is rigidly mounted upon a distributing-shaft 31, journaled in the inner frame and the right-hand outer frame. Upon this shaft are also mounted two mutilated gears 32 and 33 and a complete gear 34, Figs. 1, 2, 7, and 7$^a$. The complete gear 34 meshes with the inner members of a straddle-gear 35, mounted upon the shaft 54, journaled in the inner frames 3 and 4. This gear straddles a cam-disk 39. The outer member of the straddle-gear 35 engages with a gear 38, which is mounted upon the cam-disk 39, which is rigidly connected to the double cam-disk 40 for the purpose hereinafter described. The left-hand mutilated gear 32 transmits motion to a small gear 41, having a stop-surface and mounted upon the shaft 42, journaled in the right-hand inner and outer frames. The right-hand mutilated gear 33 engages with a gear 43, mounted on a stud 44, carried by the right-hand inner frame and having a stop-surface 45. This gear 43, through the connecting-rod 46, rockshaft 47, and rod 48, transmits a reciprocating motion to a cradle 49, carrying the axially-mounted item devices or segments 50, as hereinafter described, Figs. 3, 5, 7, 7$^a$, 7$^b$.

*Item-segment mechanism.*—The item-segments 50, above referred to, Figs. 1 and 5, consists of a series of nine toothed segments axially mounted so as to revolve independently upon a shaft 51 of the cradle 49, which is carried at the extremities of the arms of the yoke 53. This yoke is mounted so as to be free to turn upon the shaft 54, carried by the two inner frame members. The item-segments 50, mounted upon the shaft 51, have disk-like extensions cut away at 55 and 56, so as to each have two spokes connecting with the central bearing portion or hub 57, Figs. 5 and 7$^c$. Through the openings 55 of the series of item-segments 50 passes a curved frame 58, supported at each extremity by circular end pieces which are rigidly mounted upon the shaft 51, the whole constituting the cradle for the item-segments. The curved frame 58 carries two series of projections 58$^a$ and 58$^b$, which form grooves in which the inner surfaces of the rims of the several item-segments 50 bear and by which the item-segments are guided and held against lateral movement, so as not to come into too great frictional contact with one another. The circular end pieces of the cradle 49 also carry a universal locking bar or yoke 60, supported at each end by arms pivoted to the end pieces at 61. This universal locking-bar carries a rod 62, which engages with teeth 63 on the inner periphery of each of the item-segments 50, the space 56 in the item-segments affording sufficient room for the play of the said locking-bar. The end 64 of this locking-bar passes through a slot in the right-hand circular end piece of the cradle 49, on which end is a friction-roller 62$^a$, Fig. 7$^a$, which is there engaged by the cam-surface 65 of the left-hand face of the cam-disk 40, Figs. 7$^a$, 7$^b$, and so actuated thereby as to be at times brought into engagement with the teeth 63 of the item-segments and disengaged therefrom, as will be hereinafter described. The left-hand circular disk of the cradle 49 is formed with a boss 66, Figs. 3 and 7$^b$, to which is pivotally connected one end of the connecting-link 48, above referred to.

*Mechanism for positioning the item-segments.*—The item-segments 50 each have a plain circumferential extension 67, upon the upper front portion of whose periphery is preferably a series of numerals from "0" to "9"— namely, "0," "1," "2," "3," "4," "5," "6," "7," "8," and "9," one of which is visible through a sight-opening in the face-plate 67$^a$, Figs. 5 and 7$^c$. On the lower back portion of the periphery of each item-segment there is a blank space 68. The lower front peripheral portion of each item-segment carries a series of teeth 69, which engage with a corresponding number of teeth 70 upon the sliding item devices or rack-bars 71, Figs. 4$^a$, 5, 7$^a$, and 7$^c$, there being one sliding rack-bar for each item-segment. These sliding rack-bars are supported in spacing-notches 72 upon the cross-pieces 73 and 74, supported by the inner frame, and are also guided and supported at their upper edges by spacing-notches 75 in the cross-bar 76, likewise connected to the inner frame members. Each of these rack-bars 71 is provided with a retracting-spring 77, the forward end of which is connected to the forward end of the rack-bar and the rear end of which is connected to a cross-rod 78, carried by the inner frame. Each of the rack-bars 71 carries a pawl 79, which is normally held in depressed position, as shown, by the spring 80, so as to engage against a stop surface or abutment 81 of a table 82. In the operation of the machine some or all of these pawls 79 are released by the movement of the keys, allowing the rack-bars 71 to be drawn backward by their respective springs 77 until stopped by one of a a series of vertically-movable stops 110, Figs.

5 and 5ᵇ, the proper one of which is brought into position by the manipulation of the numeral-operating keys and the automatic action of column-selecting devices to be hereinafter described.

The operating-keys of the machine, Fig. 4ᵃ, may be divided into two groups—the "upper group," which corresponds to the numerals to be set up and are numbered 1, 2, 3, 4, 5, 6, 7, 8, and 9, and the "lower group" of keys, consisting of the forward space-key, the back space-key, the key R for repeating, the key E for erasing or resetting, the word or date key D, and the totalizing-key T. The forward space-key serves also as the zero-key. Each of the numeral-key levers 100 is pivoted on a bar 101, mounted in a key-frame 102, secured to the front of the main frame, Fig. 5. Each numeral-key is provided with a downward projection 103, to which is pivoted the forward end of a connecting-rod 104, the other end of the connecting-rod being pivoted to the lug 105 upon a corresponding lifter, there being one connecting-rod and lifter for each numeral-key. These lifters each consist of a cross-bar 107, supported by two pivots 108 108 to the inner frame and provided with the downwardly-projecting lug 105, to which the connecting-rod 104 is connected. The connecting-rod 104 carries a stop 104ᵃ, against which presses one end of the coiled spring 104ᵇ, the other end engaging with an abutment 104ᶜ in such a manner that whenever a numeral-key is depressed and released the spring 104ᵇ returns it and the corresponding rod to normal position. Coacting with the lifters are a plurality of series of vertically-moving stops 110, there being for item-setting purposes the same number of series of these stops as there are item-segments 50 and rack-bars 71 and in addition two series which are used in printing dates. There are nine stops 110 in each series, corresponding to the numerals "1," "2," "3," "4," "5," "6," "7," "8," and "9." There is for each series of stops 110 a sliding plate 111, having recesses 112, Figs. 4ᵃ, 5, and 5ᵇ, through which the lower ends of these stops 110 pass, the downward movements being limited by projections 110ᵇ on the stops. These plates 111 are pressed forward by springs 111ᵃ bearing against their rear ends and are each connected by a connecting-rod 113 with the depending arm of one of a series of dogs 114, Figs. 5, 9ᵃ, 9ᵇ, mounted upon the shaft 115, journaled in a forward selector-shaft frame 116. The upper arms of the dogs 114 are in positions to be successively engaged by the teeth 117 upon the selector-shaft 118, carried by the selector-shaft frame 116, as shown in Figs. 5 and 9ᶜ. When a tooth 117 upon the selector-shaft 118 engages with the upper arm of one of the dogs 114, it moves it slightly downward, thereby forcing the lower end rearward and causing the corresponding sliding plate 111, carrying the lower ends of the vertically-movable stops 110, to move rearward enough to bring those ends directly over the cross-bars 107 of the lifters, as shown in Fig. 5ᵇ. Thereafter upon the operation of any one of the numeral-keys the lifter corresponding thereto will be raised and engaging with the lower end of the corresponding stop 110 of the series, which has been moved backward by the selector, will lift that stop, so that its upper end rises above the plate or stop-table 82 through holes 120 therein, which act as upper guides. The stops 110 are each provided with a shoulder 110ᵃ, upon which normally rest pins 121, carried by a stop-lock plate 122, pressed forward by a spring 122ᵃ. This stop-lock plate 122 has a notch 123 engaging with the upper edge of a cross-bar 124, carried by the inner frame and serving to prevent the forward movement of any stop-lock plate 122 so long as it is in its depressed position. This stop-lock plate has its rear end mounted upon one end of the equalizer 125, Figs. 5, 5ᵃ, 5ᵇ, and its forward end carried by one end of an equalizer 126, the lower arms of these equalizers being connected by an equalizer-rod 127, the purpose being to hold the stop-lock plate 122 always parallel to the same plane. The springs 128 bearing against the lower ends of the rear equalizer tend to keep the stop-lock plates depressed. Whenever one of the stops 110 is forced upward by its lifter, the shoulder 110ᵃ engages with the pin 121 corresponding thereto and lifts the entire stop-lock plate, so that all the other pins 121 are raised above projections 110ᵇ of the stops and also so that the stop-lock plate is disengaged from the locking-face of the cross-bar 124, as shown in Fig. 5ᵇ. At the same time the upper face or projection 129 upon the stop-lock plate engages with the corresponding pawl 79 and moves it out of contact with the abutment 81 on the edge of the table 82. This permits the corresponding rack-bar 71 to be moved rearwardly under the influence of its spring 77 until it engages with the stop 110, which has been elevated, as shown in dotted lines, Figs. 5 and 5ᵇ. The rack-bar is thereby retracted a distance corresponding to the numeral-key depressed and the item-segment 50 meshing therewith is revolved a corresponding distance. As above stated, the series of stops which is in position to be actuated by the lifters is determined by the position of the selector-shaft 118. Among the many advantages of this construction is the uniformity of action of all the numeral-keys, the touch and the throw being substantially the same in all cases. After a movement of the hand-lever 26, Fig. 2, which brings the machine to its normal position ready for the setting up of an item on the item-segments 50, the selector-shaft 118 stands in a position represented by a spot upon the traveling indicator 130, Figs. 1 and 5, consisting of a drum carrying a series of spots arranged in a spiral. This position is determined by a "stationary indicator," so called, 131, Figs. 1 and 2, which may be manually set by a knob 132, through gears $132^a$ $132^b$ $133^a$ $133^b$, to determine the column in which the first numeral is to be set up. This is accomplished by this knob and a cylinder 133, connected to the gear $133^a$ and having spirally-arranged depressions 134, adapted to take the nose 135 of any one of a series of stop members or dogs 136, movably mounted on a shaft 137, carried by the selector-frame and so located that their rearward and downward ends 138 fall into the path of corresponding teeth of the selector-shaft 118, Figs. 5, $9^b$, thus constituting a variable stop for the selector-shaft. The spiral arrangement of the depressions 134 on said drum allow the upper end of only one of these dogs to enter a depression at a time, and hence allow the lower end of only one of these dogs to come into the path of a tooth of the selector-shaft at any given time. The normal position of this depressed stop 136 is therefore such as to interrupt the motion of the selector-shaft 118, which thus determines the initial position, or the position of the initial figure in the item. This is indicated to the eye by the traveling indicator 130, which is geared to the selector-shaft 118 by the segmental gear 139 and moves synchronously therewith. To disengage the selector-shaft 118 from the dog 136, which determines its initial position at the beginning of the operation of setting an item, I provide a yoke 140, loosely mounted on the shaft 137 and engaging rearward projections 142 on all the key-bars and also engaging a forward projection 143 on the upper part of any dog whose nose has entered one of the spiral depressions of the stationary indicating-drum 131. When the first key is depressed, this yoke throws the rearwardly-projecting member of the depressed dog 136 out of engagement with the tooth on the selector-shaft 118, allowing the selector-shaft to come under the control of an escapement consisting of a ratchet-wheel 144 and pallet 145, Figs. 2, $8^a$, and $8^b$, the latter consisting of two pivoted members and a restraining-spring $145^b$. The pallet is connected by a link 146 with a universal yoke or bar $146^a$, pivoted at $146^b$ and connected to the engaging member $145^a$ of the escapement, which yoke or bar $146^a$ is engaged and moved backward by downward projections 103 on the numeral-keys and also on the zero-key. The universal bar is retracted by a spring $146^c$. Every backward movement of this universal rod moves the escapement backward, so that when the escapement is in control it allows the selector-shaft 118 to move through a space represented by one tooth of the said ratchet 144, being impelled by the actuating segmental skeleton gear-wheel 139, Fig. 8, mounted on a stud on the selector-frame and meshing therewith, and a spring $139^a$, one end of which is connected to said wheel, while the other is connected to a stationary part of the frame. The spring $139^a$ is put under tension when the selector shaft 118 is reset to its full limit of backward motion, as hereinafter described. The resetting of the selector-shaft to its full limit is necessary to provide for the use of the dating-column or for any large number that might be desirable to set up on the item-segments 50. Provided, however, the number to be set up is small and that no dates are to be put in, the selector-shaft and its corresponding indicating-drum return automatically to the position previously determined by the stationary indicator-drum 133 and its stop-dogs 136. At the extreme left of the series of stop-dogs 136, controlling the initial position of the selector-shaft, I provide a dog $136^a$, Figs. 9, $9^a$, $9^b$, similar to the other dogs except that it has no forward projection engaging with the stationary column-indicator drum 133. This is provided for use in case the dating instrumentalities of the machine are to be used and stops the selector-shaft 118 two spaces farther to the left than the highest position that can be indicated by the stationary column-indicator 131. In this position the first digit-keys operated act to produce the positioning of certain rack-bars $71^a$, which may be called "dating" rack-bars as distinguished from numeral or item segment rack-bars 71. To avoid having to operate the spacing-key through the intermediate positions between the dating-column and the initial figure in the item to be set up, I provide on the right-hand end of the selector-shaft 118 a separate and extra projection 147, Fig. $8^a$, not in the sliding-rack series, which after the first figure in the date has been struck raises a rearwardly-projecting arm 148 on the hub 149, which in turn carries a flat spring 150 so adjusted as to engage a projecting arm 151 on the pivoted releasing member 152 of the escapement-pallet 145, so that when a second figure in the date is struck, the extension 151 being thereby depressed, the flat spring 150, put into tension by the turning of the hub 149, snaps into engagement with the notch $152^a$ on the extension 151 of the releasing member of the escapement-pallet 145, Fig. $8^a$, and holds it out of engagement with the ratchet-wheel 144. When the key is returned to its normal position, it lifts the ratchet, so as to free its detaining member from the rear of the ratchet, and the tension of the actuating-spring $139^a$ at the left, Fig. 8, revolves the selector-shaft 118 until it comes to a stop against the stop-dog 136, whose nose is in a depression in the indicator-drum. To prevent the escapement from working in resetting the selector, I utilize the same forward projection 151 on the releasing member of the escapement. In case there are no dates to be put in I hold the dog $136^a$ out of action by depressing the key $136^b$ and holding it depressed by the latch 136ᶜ, Figs. 9, 9ᵃ. The key 136ᵃ is rigidly connected to the detent 136ᵈ on the shaft 101. The depressing of the key 136ᵇ moves the detent 136ᵈ so as to move the dog 136ᵃ out of the path of its selector-tooth, thereby permitting the selector to revolve to the position determined by the cylinder 133 of the stationary column-indicating mechanism. Under these conditions, of course, the selector-shaft 118 in being reset goes into its extreme left-hand position just the same; but the lug 147ᵃ at the right-hand end, Fig. 8ᵃ, then comes into useful play, throwing down this same spring catch or stop 150 into the path of the forward projection 151 and holding the releasing member 152 of the escapement out of engagement until the spring-catch is withdrawn upon the operation of a key, permitting the releasing member to again come into engagement with the ratchet-wheel.

In order to cause the releasing member 152 of the escapement to come into contact with the spring-catch 150, whose function it is to hold the releasing member 152 out of engagement with the ratchet-wheel, I provide a finger 160, Figs. 8ᵃ, 8ᵇ, projecting from the ratchet-wheel proper, 144, and reaching out beyond its periphery and coming into engagement with a pivoted member 161, carried by the releasing member and having an angular face which holds the releasing member 152 in such relation to the finger 160, carried by the ratchet-wheel 144, as to provide sufficient forward displacement of the releasing member 152 to allow the spring-detent 150 to fall into the notch 152ᵃ, provided for it, thereby holding the releasing member 152 out of engagement with the ratchet 144. This pivoted member 161 is provided with a spring 162, so as to yield and permit the tooth 160 to pass freely in a reverse direction.

In case it is desired to retract the selector a single tooth—as, for instance, when the machine is set for figures containing three digits and it is desired to set up one containing four digits—the back space-key is used. This is pivoted to the bar 153 in the the front frame of the machine and has connected to it a pawl 154, Fig. 8, the upper end of which is guided by a pin 155, mounted on the frame, so as to engage the segmental gear-wheel 139 on an upward movement and rotate it in a reverse direction the distance of one tooth, the ratchet on the selector-shaft retaining it in retracted position. A pin 156 upon the pawl 154 engages an arm 157, connected with a rod 158, carrying another arm, 159, engaging the bent lever 148, Figs. 2, 8ᵃ, 8ᵇ, and causing it to lift the spring 150 out of engagement with the notch 152ᵃ in the projection 151 from the pivoted member 152 of the pallet, thus permitting the selector-shaft to at once come under the control of the escapement.

*Key-interlocking mechanism.*—To avoid possible errors that might occur by a partial depression of the keys, which may cause a spacing effect without releasing the rack-bars, I provide an interlocking device for the numeral-keys and the zero-key, Figs. 1, 2, 3, and 5, which consists of a yoke 163, pivoted on brackets 164, extending from the forward frame of the machine. This yoke 163 is pivoted on the rod 163ᵃ, its axis of rotation being therefore eccentric to the center of the bar 101, on which the numeral-keys and zero-keys swing. In the outer face of this yoke 163 I provide holes 165 to correspond with the digit and zero keys, on which are formed rearwardly-projecting points or fingers 166, adapted to enter the holes 165 in the face of the eccentrically-swinging yoke. It will be readily seen that in depressing a numeral-key the rearwardly-extending finger 166 enters a hole 165 in the yoke. These holes are on a line with each other and parallel to the axis of the yoke. When the yoke is depressed, it brings the holes out of line with the rearward projections on the keys not so depressed. When one key is depressed, it bears upon the ledge 167 and depresses the yoke, so as to bring it out of alinement of the keys not depressed and by reason of this prevents the operation of those keys until the first key, together with the yoke, is restored to its normal position. In order to insure that any key that is operated shall be fully depressed, a compound pawl, Figs. 1 and 2, is provided, consisting of a detent 168, which is hung on an oscillating plate 169, carried by a pin 170, supported by the lug 164 and engaged by a pin 172, carried by an arm 171, depending from the yoke 163. This compound pawl when the yoke is depressed allows the detent 168 to fall in and engage the notches in the plate 173, integral with the arm 171; but a continuation of the depression of the yoke to its limit causes the pin 172 to swing the supporting member 169 of the pawl into such a position as to carry the pawl 168 out of engagement with the notches in the plate 173, which will then allow the depressed key and the yoke to take their normal positions and in so doing reposition the pawl-carrying member 169.

*Numeral-key and resetting-key interlock*, (Figs. 2, 3, and 8.)—In resetting the selector-shaft 118 the numeral and zero keys must be in their normal position, for the reason that when a bar 107 of a lifter is slightly raised by depression of a key it prevents the normal movement of the lower ends of the stops 110, which when the selector-shaft 118 is reset have a reciprocating motion forward and back. To avoid this, I provide at the left-hand end of the locking-yoke 163 a pin 174, Figs. 3 and 8, which engages a pivotally-mounted lever 175, having a rearwardly-projecting finger 176, also carrying a pin 177, designed to engage a swinging locking-plate 178, which is connected by a link 179 with an arm 179ᵃ on the selector-shaft-resetting device. This aforesaid pin 177, by means of its supporting-lever 175, rises in front of the swinging locking-plate 178 as the yoke is depressed through the depression of a key and effectually bars the resetting of the selector-shaft 118, thereby preventing any strain or damage to the machine by careless operators. It prevents the manipulation of the resetting-key E, and vice versa. When the key E is being manipulated and the resetting devices are in play, the swinging plate 178 locks the swinging yoke 163, so as to prevent the operation of the numeral-keys, thereby forming a complete interlock between these devices. The rearward portion of the lever 175, carrying the locking-pin 177, before referred to, is so arranged as to come into the path of an arm 180, mounted on an extension of the selector-shaft 118, and provides a positive stop for the lever 175 and key-locking yoke 163, and hence the numeral and zero keys, after an item has been fully set up and after the selector-shaft 118 has therefore completed its full forward rotation.

*Mechanism for resetting selector-shaft,* (Figs. 2, 3, 4ª, 8, 10.)—To provide for the resetting of the selector-shaft 118, both automatically, as in the case of the normal operation of the machine, and manually, as in the case it is desirable to use the push-rod E, I provide at the left hand of the selector-frame 116, which carries the selecting and column indicating devices and is rigidly fixed to the inner frame members, a segmental spoked wheel 139, having on its periphery gear-segments, the lower gear-segment adapted to engage a gear 183, fixedly mounted on the selector-shaft, the upper segment being adapted to engage a similar gear 184, mounted on the shaft of the traveling indicator-drum 130 in such a way as to provide a corresponding movement of the traveling column-indicating drum with the selector-shaft. Also on the forward part of the same spoked wheel ratchet-teeth are provided, adapted to be engaged by the pawl 154, pivotally connected with the lever of one of the lower bank of keys called the "back spacing-key," the manipulation of which causes a backward movement of the toothed wheel 139 and corresponding backward movement of the selector-shaft 118 and traveling indicator-drum 130, they being geared directly to the segmental gear, as before described. Extending downwardly and rearwardly from this spoked and toothed wheel 139 I provide a slotted link 185, Figs. 3 and 8, to the forward end of which is attached a spring 139ª, extending downwardly and rearwardly and being attached to a fixed portion of the frame. In the slotted portion of the link 185 I provide a pin or screw 186, which is mounted in the outer end of an arm 187, supported from a rock-shaft 188, which is pivotally mounted in the outside frames of the machine. This shaft 188 may be given its rocking motion by either of two devices, first, by a connecting-link 189, rearwardly extending from an arm 189ª to an arm 190, pivoted to a stud 191 on the left-hand frame of the machine, Fig. 3, and having a finger 190ᵇ, adapted to engage one of the lugs 16ᵇ on the drum-head 16 in such a way as to be positively moved forward upon the movement of the drum-head caused by the forward movement of the curved rack 22 in every complete cycle of the machine. A rearwardly-projecting arm 190ª engaging with the frame limits the backward movement of this arm 190. The devices here described are those that come into play in the ordinary operation of the machine either by means of the foot-lever or of the hand-lever; second, to provide for resetting the selecting devices in case an erasure becomes necessary I provide on the rock-shaft 188 at its right-hand end a fixedly-mounted arm 192, which is engaged by a bell-crank lever 193, loosely mounted upon the T-lever shaft 205, which is immediately forward of and parallel to the rock-shaft before mentioned, Fig. 11ᵇ. This bell-crank lever 193 has at its upper end a pivotal connection 195 with the manually-operated push-rod 196, which when pressed backward brings the rearward arm of the bell-crank into engagement with the fixedly-mounted arm 192 on the rock-shaft, and thereby rocks it downward and gives it the same degree of movement as is given to it by the automatically-operated arm 190 and link 189 at its opposite end, thereby resetting the selector-shaft 118 and its indicating-drum.

*Numeral-key and controller-interlock.*—To provide against the tripping of the machine and possible damage at a time when a numeral-key is wholly or partially depressed, I mount upon the universal key-yoke shaft 147ª at its left-hand end an arm 197, Fig. 3, and also upon the left-hand member of the main frame of the machine a swinging hook 198, Figs. 3 and 6, which is connected with the arm 197 by a normally spring-extended link composed of two members 199ª 199ᵇ. These two members have a pin-slot and spring connection with each other, Fig. 6ᵈ, so arranged that should the hook 198, as is possible when the machine is operated rapidly, be held rigidly in position the keys could yet be operated. The hook 198 upon the depression of any one of the numeral-keys is so operated by the arm 197 and link 199ª 199ᵇ that it tends to move forward over a pin 198ª, projecting laterally from the arm 29, extending forwardly from the controller 13 in such a way as to prevent the upward movement of that arm, and thereby prevent the movement of the controller and the release of the spring-drum and main shaft by the operation of the operating handle or treadle. This therefore provides an additional interlock. This lock tends to completely prevent the starting of a cycle of operation of the machine when a numeral-key is wholly or partly depressed. The interlock previously referred to, operated by the action of the swinging key-locking yoke 163, serves simply to prevent the operation of certain parts of the machine—namely, to act as an interlock between the keys and the selector-shaft-resetting devices, both manual and automatic.

The universal-yoke bar 146ª, Figs. 2, 8ª, and 8ᵇ, actuated by the numeral-keys, has at its right end a link 146, connecting the same with the escapement for controlling the selector-shaft so that upon the depression of any numeral-key or the zero-key the escapement is actuated to permit the selector-shaft to rotate one tooth, as before described.

*Spacing-key.*—The right-hand key of the lower bank constitutes a space-key and is also the zero-key, Figs. 2, 4ª, and 5. Its lever 100ª is mounted upon the same shaft 101 as that which carries the levers of the numeral-keys and is connected by a link 100ᵇ with the lever 100ᶜ, pivoted on the same shaft 153 as is the back-spacing key-lever, so that the movement of the finger-pieces actuating these two keys will be the same. The lever 100ª of this space-key engages with the universal bar 146ª, the same as do the levers of the numeral-keys, and also with the swinging locking-yoke 163, so as to prevent other keys being depressed when it is partially depressed and so as not to be capable of being depressed when other keys are partially depressed. It also has a forward projection the same as on the numeral-keys which engages with the universal yoke 140, which serves to withdraw the dog 136, blocking the selector-shaft 118, the upper nose of which is within one of the recesses 134 in the column-indicating drum, thereby performing all the spacing functions of a numeral-key, though not acting on any stationary item devices.

*Means for resetting the rack-bars*, (Figs. 2, 5, 10, 10ª, 10ᵇ.)—In the resetting of the rack-bars 71 after an item has been set up on the item-segments 50 I use a bell-crank 200, loosely mounted on the rock-shaft 188 and having at its outer end an arm 200ª, projecting into the path of lugs 201, provided on the main driving-gear 6 at the right-hand side of the machine and also provided with a pivotally-mounted forwardly-extending beam 202, having an abutment 203 so arranged as to engage the nose of an upwardly-projecting arm 204, rigidly mounted upon a shaft 205, carrying at its center a bent T-lever 206, whose upper and T end 207 extends laterally and lies in the path of the downward projections 208 on the rack-bars 71. At the close of a cycle, at which time the rack-bars 71 are repositioned, one of the lugs 201 on the main gear 6 at the right hand of the machine, Figs. 2 and 10, engages the arm 200ª on the bell-crank 200, carrying it forward, and with it the beam 202, with its projection engaging the arm 204 on the T-lever shaft 205. This movement carries the T end 207 of the T-lever forward, and with it any of the rack-bars 71 which may have been retracted, thereby bringing them all into their normal or set position. In this position their pawls 79, Fig. 5, engage with the abutment 81 at the front edge of the frame or table 82, carrying the stops 110, which project through it when it is desired to position the bars. The pawls 79 are supplied with springs 80 to hold them in this position and to prevent accidental displacement. These pawls are each positioned directly over their respective stop-lock plates 122, which lock the stops 110 in their active positions, and each is so arranged that when a stop of its series is lifted the upper corner 129 of the corresponding stop-lock plate 122 comes into contact with the lower face of a pawl 79 in such a way as to lift it out of engagement with its abutment 81, thereby allowing it and its rack to take a retracted position. At the close of a cycle the bell-crank 200 referred to, with its connected parts, is drawn back to its normal position by a spring 200ᵇ, leaving all of the bars 71 free to move as far as the T-lever 206 is concerned. At the bottom of the forward portion of each sliding rack-bar 71 I provide ratchet-teeth 209, Fig. 5, and in the forward guide-frame supporting the sliding racks 71, which is supported between the inner frames, I locate detents 210, pressed by springs 211 and so arranged as to engage the notches 209 in the bottom of the corresponding rack-bars when in any one of their several positions. These detents are thrown out by a pivotally-mounted and upwardly-extending yoke 212, hung between the inner frames and controlled by projections 213 on the inner or right-hand side of the spring-drum 9, which projections come into engagement with an arm 212ª on the shaft of the yoke and move it, so as to hold the spring-pressed detents 210 out of engagement with the notches in the rack-bars when the machine is not in operation—that is, during the intervals between cycles. This lug 213 also actuates a detent 213ª, which engages with a pin 213ᵇ on the winding-sector, preventing two complete forward movements of the sector during a single cycle.

To provide for the returning to their normal positions of the stop-lock plates 122 and their respective series of stops 110, I provide in front of the stop-lock plates and pivotally mounted between the inner supporting-frames an upwardly-extending yoke 214, Figs. 5 and 11, adapted to engage the inclined forward faces of the stop-lock plates 122. This yoke 214 forces the stop-lock plates 122 backward against the action of springs 122ª, which engage their forward ends. They are impelled downward by the action of springs 128 at the rear, which engage fingers on each of the rear equalizer-plates 125. This downward movement is also facilitated by the inclined faces at the forward ends, which are engaged by the yoke 214. The yoke referred to is controlled in its operation by the curved finger 215, located at the right-hand side of the machine outside of the main driving-gear 6 and arranged to engage either of the two lugs 201, mounted on its outside face. This finger 215 is retracted by spring 215$^c$ and supported by brackets 215$^a$ and 215$^b$, loosely mounted on the rock-shaft 188, the left-hand bracket 215$^b$ having at or near its upper end a projecting pin 216, so arranged as to engage a hook 217, pivoted upon the lower end of an arm 218, depending from the stop-lock-resetting yoke 214 and held depressed by a spring 219, which also depresses a yoke 219$^a$, loosely mounted on the shaft 188, which is used to raise the hook 217 when an item is to be repeated. The right-hand bracket 215$^a$ has an arm 220, arranged to engage a projecting lug 221 on the resetting bell-crank 193, operated by the resetting-key. At the beginning of a cycle of the machine one of the lugs 201 on the main drive-gear engages the curved finger 215, which is connected by means of the spring-pressed hook 217 to the resetting-yoke 214 of the vertical stop-lock plates 122 and and forces the stop-lock plates backward and downward, thereby letting fall the one of the perpendicular stops 110 in each series which had been held in position. At the beginning of a cycle the spring-pressed detents 210 under the forward ends of the rack-bars 71 are released by reason of the lug 213 disengaging the projection 212$^a$, so that they enter the notches provided for them and hold the rack-bars in position even after the stops 110 have been let fall away from the rear of the retaining-pawls 79.

*Resetting stops before completion of a cycle.*—The arrangement of the parts as described allows for the immediate repositioning of the stop members 110, Fig. 5, of the rack-controlling devices immediately after the beginning of a cycle of the machine, whereby another item may, in effect, be potentially set up on the stop members 110 before the rack-bars 71 have been reset, allowing for greater rapidity in operation, it being understood that the rack-bars 71 are reset at the very close of a cycle and it being necessary that they should be retained in the positions in which they were originally set up until reëngaged by the item-segments near the end of the cycle. As before stated, this retention is accomplished by the pawls 210 engaging with the notches on their under surfaces. The resetting-rod 196, Figs. 2 and 10, through the medium of its bell-crank 193 when operated acts upon the devices heretofore described for resetting the stop-lock plates 122 and stops 110 as well as for repositioning the rack-bars 71, bringing the whole into normal position ready for the setting up of a new item. The engaging arm of the bell-crank 193 referred to engaging both the rock-shaft arm 192, which resets the selector-shaft as heretofore described, and also engaging the forward arm 200$^c$ of the rack-bar, resetting bell-crank 200, which acting through its horizontal beam 202 throws the T-lever 206 forward, carrying the rack-bars 71 into position in the same manner as though it were operated by the lugs 201 upon the main driving-gear 6, Fig. 2, and the downward and rearward projecting lug 221 on the same bell-crank 193, engaging a projection 220 on the right-hand bracket 215$^a$ of the frame, which is normally operated by the curved arm 215, engaging with the lugs 201 upon the main driving-gear 6, and moving it in the same manner to release the stop-lock members 122. It will be seen that after a rack-bar 71 has been retracted by its spring and its pawl 79 rests against a stop 110, Fig. 5$^b$, the yoke 212 being released by the lug 213 on the spring-drum at the beginning of a cycle of the machine, Fig. 6, will allow the spring-pressed detents 210 to enter the notches 209 upon the bars 71, and at the same time the curved finger 215 engaging a lug 201 on the main driving-gear will throw down the supporting-stops 110, allowing the rack-bars 71 to be held in position by the spring-pressed detents 210 at their forward ends. The stops 110 and stop-actuating mechanism are now ready to be repositioned for a new item, while still the first item is in process of being added and printed. It will be understood, of course, that the selector-shaft 118 has been reset by its particular devices, this being done directly by the movement of the operating-crank 26 at the beginning of the cycle, as before described. A depression of the several numeral-keys will now raise into active position corresponding stops 110; but they will not come into service until after the rack-bars 71 have been brought forward at the close of a cycle. When a stop 110 is raised, the upper and forward faces 129 of the stop-lock plate 122, being in the same plane with the top of the table 82, over which the rack-bar pawls 79 pass, will then prevent the corresponding rack-bar pawl 79 from engaging the abutment 81, and when released by the retraction of the T-lever 206 at the end of a cycle it will fall back against the stop 110 thus positioned, giving a new position to the corresponding item-segment 50. If the stop 110 so raised during a cycle of the machine should be in front of the corresponding pawl 79, the pawl in being brought forward by its rack-bar 71 will drag over the top of the stop, which will not at all interfere with its correct working. Thus at the end of a cycle a second item may be wholly or partially set up on the item-segments 50, it being thus possible to keep the machine in constant rotation. For the purpose of closer alinement and additional safety I provide over the forward ends of the sliding rack-bars 71 and engaging the upper teeth at the rear of the item-segments 50 a locking-yoke 230, Fig. 5, pivoted between the inner frames and having an outward connection 231, Figs. 4ª and 7, with the cam 232, formed on the inner face of the straddle-gear 35, forming an intermediate connection between the distributer-sleeve and the lifting-cams on the item-segment shaft, thus forming a positive and sure lock against the breaking of the relation between the item-segments 50 and the racks 71. The cam 232, controlling the yoke 230, is so shaped and timed as to release the yoke from the rack-bars prior to any forward movement of the resetting T-lever 206.

*Accumulating mechanism.*—After an item has been set up on the item-segments 50 a movement of the actuating crank-arm 26 or the foot-lever, as the case may be, releases the spring-drum 9 from the control of the controller 13, communicating motion through the main driving-gear 6 at the right of the machine to the distributer-sleeve 31, Figs. 7, 7ª, by a direct connection with a pinion 7 at the right-hand end, which is fixedly mounted upon this sleeve, and to a mutilated gear 33, rigidly mounted thereon and engaging a corresponding gear 43, having a stop-face designed in its rotation to communicate an oscillating motion to the cradle 49, which supports the item-segments. A smaller mutilated gear 32 is also rigidly mounted on the distributing-sleeve 31 and communicates with a stop-face pinion 41, which, communicating with another pinion, revolves the carrying-shaft 260 one complete revolution for every cycle of the machine. The distributing-sleeve 31 also carries a plain spur-gear 34, meshing with an intermediate straddle-gear 35 beneath it, having the cam 232 formed on its inner face, which operates on the projecting end of the yoke 230 to cause it to lock and unlock and aline the rack-bars at the proper time. This straddle-gear 35 is so formed as to have a clearance-space for the outer cam-disk 39, carried by the item-segment shaft, upon which is mounted a driving-gear 38, meshing with the outer member of the straddle-gear 35 and through the means of the lifting-cams 39ª on its inside face communicating an upward and rearward motion to the body of item-segments in case the operation is subtraction. A similar cam-disk 40, fixedly mounted with it and having a cam-surface 40ª, provides a similar motion to the body of item-wheels 50 in case of addition. The connection between the cams 39ª and 40ª and friction-rollers 390, Figs. 7ᵇ, 7ᵈ, and a sliding abutment is formed by the upturned lower end 392 of an arm 393, Fig. 18, depending from the sliding shaft 54, upon which the item-segment yoke 53 is pivoted, said arm having its upper end 395 forked to engage a recess 505 in a hub on a pinion 503, forming one of the members of the carrying-train. The lower upturned end 392 engages a notch 396 in the lower end of one or the other of the beams 397 397ª, pivoted at 398, of which beams one only is designed to engage the abutment 392 at any given time, the other swinging idly, but being capable of being engaged by the abutment 392 on the lower end of the shifter-arm 393 by a lateral motion of the shaft 54, upon which the shifter-arm 393 is supported. The sliding shaft 54 is actuated by an arm 399, engaging therewith and mounted on a sliding shaft 400. This shaft carries a bent arm 401, which engages a worm 402, which can be rotated by the knob 403. This also shifts the pinion 503, as hereinafter described. The inner face of the broader of the two cam-disks 39 and 40, mounted upon the item-segment shaft, has formed in it also a cam-groove 65, in which operates a friction-roller 62ª, mounted on the outer end of the bar 64 of the swinging yoke 60 for locking the item-segments, as before referred to. This yoke 60, as before described, is supported by the outer flanges of the oscillating cradle and provided with a locking-bar 62, adapted to engage the internal teeth in the apertures within the item-segments. These teeth are ten in number, corresponding to the figures "0" to "9" indicated on the periphery of the item-segments. The throwing out of the controller 13, Fig. 3, by the action of the hand-lever 26, Fig. 2, sets in motion the main driving-gear 6, which in turn revolves the distributer-sleeve 31 and rotates through the intermediate gears first the item-segment, lifting cam-disks 39 and 40 by the means of their attached gear. The intermediate gear 35 by means of its cam 232 immediately throws down the rack-bar, locking yoke 230 into the teeth on the upper side of the rack-bars 71, securely holding the rack-bars 71 in position until released by a further movement of the cam 232. At one and the same time the cam 65 on the inner surface of the cam 40 and adjacent to the item-segments 50 throws its engaging yoke 60 into the internal teeth 63 of the item-segments, securing them in their set positions. These two yokes, the item-segment yoke 60 and the rack-bar yoke 230, operate simultaneously and before the item-segments 50 are lifted out of engagement with the rack-bars 71 and remain in engagement until the item-segments again engage the rack-bars, thus insuring their return to the proper relative positions of item-segments and the rack-bars. A further movement of the item-segment cams 39 and 40 results in a raising of the yoke 53 and cradle 49, supporting the item-segments, together with the cams themselves. In the case of addition this is a direct and continuous movement due to the cam 40ª on the outside face of the broad cam-disk 40, resulting at once in a contact of the teeth of said item-segments with the teeth of the accumulator-wheels 300 of the accumulating mechanism. A further movement of the distributer-sleeve 31 brings into engagement the teeth of the outer or right-hand mutilated gear 33 with the teeth of its corresponding stop-face pinion 43 in such a way as to give the stop-face pinion 43 a rotary motion, continuing in this motion until one revolution is completed. This revolution through the means of the curved connecting-rod 46, pivoted to the face of the pinion and having its lower end connected with an arm on the right-hand end of a rock-shaft 47, loosely sleeved on the center of the main driving-shaft and carrying at its left-hand end an arm connected by means of a curved link 48 with a stud 66 on the left-hand end of the item-segment cradle 49, communicates an oscillating or rocking motion to the cradle and the item-segments as a body. This brings into active engagement with the accumulator-wheels 300 any of the item-segments 50 which may have been set up to represent any one of the digits, resulting in a greater or less degree of movement of the accumulator-wheels 300 so engaged. It will be seen from the foregoing that in order to retain the accumulator-wheels 300 in the position given them by the forward movement of the item-segments it is necessary to withdraw the item-segments 50 from their engaging position into an intermediate position between the accumulator-wheels 300 and the rack-bars 71, where a backward movement of the item-segments may take place without effect either upon the accumulator-wheels or the rack-bars. This is accomplished by means of the same lifting-cam 40$^a$ on the right-hand side of the wider of the two cam-disks, which are mounted upon the item-segment shaft. As the motion of the gear 43 with the stop-face is continuous after once started, it will be seen that this is rapid and continuous. After the completion of the revolution of the stop-face gear 43, connected with the item-segment cradle 49, a further motion of the cam 40$^a$ results, bringing the item-segments into engagement with the rack-bars in their original starting position and relation.

In the case of adjusting the machine for subtraction one turns the knob 403 at the left of the machine, Figs. 1 and 18, so as to produce a lateral movement of the shaft and the shifter-arm 393 to the right, which releases the cam-beam 397 used in addition and fixes in stationary position the cam-beam 397$^a$ to be used in lifting the item-segments for subtraction, Fig. 18. Now a releasing of the main driving mechanism produces the same rotary effects on the gears 33 43 and cams 39 40, with the result, however, that the lifting motion first described in the case of addition is only partial—that is, the item-segments 50 are lifted only sufficiently to become disengaged from the rack-bars 71, where they are held until the completion of the forward rotation of the cradle 49, carrying with it the item-segments 50. The cam 39 is so arranged that the continuation of its action then lifts the item-segments 50 into engagement with the accumulator-wheels 300 and holds them there while the segments are reversely rotated, with the effect that the accumulator-wheels 300 are turned in the opposite direction from what they were in the case of addition, because they now engage with the item-segments 50 during their backward movement. At the close of the movement of the stop-face gear 43, controlling the oscillation of the item-segments in the case of subtraction, the cams let the item-segments fall at once from engaging position with the accumulator-wheels directly into the engagement with rack-bars to complete their movement.

On the inner side of the plain spur-gear 34, mounted directly on the distributer-sleeve 31, a cam 301, having three pointed projections, is fixed, Figs. 7$^a$ and 16$^c$. These projections are so arranged as to act upon the pin 302, carried by the arm 305, to operate the accumulator-justifier 303, consisting of a pivoted yoke having V-shaped projections 304, adapted to engage the accumulator-wheels 300 at three different times during the cycle, once at the very beginning of the cycle to justify and aline the accumulator-wheels, again at the close of the movement of the item-segments and before the beginning of the carrying function, and again at the close of the cycle of the machine. This guards against any irregularity or displacement that may occur in the positioning of the accumulator-wheels. The cam-engaging member or arm 305 of this yoke is yieldingly connected with the yoke by means of a spring 306, holding the pin 304$^a$ in engagement with the arm 305$^a$ of the cam-engaging member, which spring, however, is seldom, if ever, in active operation, simply forming a safety device in case by manipulation the accumulator-wheels should become so displaced as to have a point of the justifier-teeth 304 engage with the point of one of the teeth on the accumulator-wheels. On the rearward portion of the cam-engaging member or arm is formed a flat surface 307, set at an angle to the plane of rotation and which is adapted to engage an arm 308, depending from the total-printing yoke, to be hereinafter explained.

The accumulator-wheels 300, Figs. 5 and 12, are furnished with fine teeth 309, which mesh with gear-teeth 310 on a set of indicating idler-wheels 311, which show definitely the position of the accumulator-teeth and by numbers upon their surfaces indicate the total of the items set up.

The worm 402 has a locking-face having recesses with which the detent 405 engages when the parts are in proper position for addition or subtraction, Fig. 18ᵇ. The worm 402 also has recesses which at such times admit the projection 405ᵃ on the controller, thus forming an interlock between the controller and the worm 402.

*Carrying mechanism*, (Figs. 5, 7, 7ᵃ, 12ᶜ to 12ᵏ, 18ᶜ, 18ᵈ.)—The smaller mutilated gear 32, mounted upon the distributer-sleeve 31, engages a pinion 41, having a stop-face and designed to make one revolution for each cycle of the machine. This pinion 41 is rigidly mounted upon a sleeve having toward its inner or left-hand end two adjacent pinions 500 501, of which the right-hand one, 500, engages a broad intermediate pinion 502 downward and to the rear of it, and the inner or left-hand one, 501, engages in the case of addition with a small pinion 503, mounted upon the carrier-shaft 260 and feathered thereto and having a recess 505 at its inner end designed to be engaged by a fork 395 on the upper end of the shifting arm 393, heretofore described, Figs. 7, 7ᵃ, 18ᶜ, 18ᵈ. The intermediate pinion 502 in this series has a broader face than either the driving-pinion 500, engaging therewith, or the driven pinion 503, so that the pinion 503, feathered upon the carrier-shaft, may either engage directly with the driving-pinion 501 or by use of the knob 403 at the left hand of the machine, used to shift from addition to subtraction, it may be disengaged from the driving-pinion 501 and engage with the intermediate pinion 502. When in this position, it moves freely under the action of the intermediate gear 502 and without direct engagement with either of the two driving-pinions 500 501 on the main sleeve. This arrangement provides for obtaining either a forward or backward revolution of the sliding pinion 503 and the carrier-shaft, which thus make one revolution for each cycle of the machine and at a time beginning at the close of the oscillating movement of the item-wheel devices, the direction being determined by the adjustment for addition or subtraction.

What I will here term the "carrying-wheels" are a series of wheels 510, Figs. 5 and 12ᶜ, loosely mounted on hubs 522, fixed upon a sleeve 511, fixed on the carrier-shaft 260, and corresponding in number to the accumulator-wheels 300 and meshing therewith and having on their left-hand faces projecting pins 512, which as they are revolved, as in the case of addition, each engage with a nose on the upper and forward end of a series of trigger-plates 513, Figs. 12ᵈ to 12ᶠ, whose downward and rearward end 513ᵃ is adapted to enter a notch 514 in a spring-actuated plate 515, having a reciprocating motion, and which I will here call a "ram." The reduced portion of this ram 515 enters a hole 516 in the cross-frame 517 of the machine and is impelled out and forward by the compressed spring 518. To the forward end of this ram is pivoted a plate 519, having at its extreme forward end a finger 520 and adjacent thereto and securely mounted upon it a segment of a gear 521, consisting of two teeth of like pitch and dimensions with the teeth of the carrying-wheels 510. The carrying-wheels are loosely mounted upon the carrying-sleeve 511 by means of hubs 522, which are securely fixed to the sleeve and revolve with it. These hubs 522 have at different positions upon their peripheries teeth 523. The location of these teeth vary in position from the right to the left, and vice versa, forming two spirals as the hub is revolved in relation to a fixed point, the teeth on the first hub to the right being comparatively close together, the teeth on the second hub being somewhat farther apart and continuing in this way through the series until the teeth on the extreme left-hand hub, corresponding spirally to the teeth on the right-hand hub, are exactly in line. These spirals run in both directions from the right to the left and left to right, as it is necessary for addition to turn the sleeve 511 and the hubs 522 in the opposite direction to that in which they are turned for subtraction. These spirals are partly shown in the drawings, Fig. 12ᶜ. When a pin 512 on the carrying-wheels has engaged the upper and forward end of one of the triggers 513 sufficienty to release its rearward end 513ᵃ from the notch 514 of the ram-plate 515, the pressure of the spring 516 in the barrel forces the ram-plate forward against a restraining-bar 524, which is hung in a swinging yoke 525, pivoted at 525ᵃ, supported by the inner framework of the machine and having an outwardly-projecting arm 526, carrying a roller 526ᵃ, adapted to engage a cam 527 on a secondary shaft 527ᵃ, (see Fig. 2,) which is supported by the extreme right-hand outer frame and the left-hand inner frame of the machine. The initial movement of the ram 515 and its pivotally-supported member is only of sufficient amplitude to prevent the trigger 513 from falling back into the notch from which it was displaced when the pin 512 on the carrying-wheel passed. It will be well to state here that no carrying takes place until the item-segments 50 have finished their work upon the accumulator-wheels 300. This initial positioning of the carrier-rams 515 and fingers, however, does take place at different times during the operation of the item-segments upon the accumulator-wheels. After the item-segments have been withdrawn from the accumulator-wheels, and therefore all the pins 512 have been positioned so as to operate on the adjacent triggers 513, tripping them from engagement with the notches in the rams 515, the pressure of the springs 518 in the spring-barrels against the shaft-supporting yoke allows the yoke 525 to swing forward, which permits the teeth 521, carried by the outer end of the pivoted member of the ram to come into engagement with the teeth on the next succeeding carrier-wheels 510 and its finger 520 to come into the path of the teeth 523 of the carrier-hubs, which are fixedly mounted on the carrier-shaft. It will now be seen that any rotation of the carrier-shaft will bring the teeth 523 on its hubs into engagement with the fingers 520 of the swinging members whose adjacent teeth 521 are at the same time in engagement with the teeth of the carrier-wheels 510, and a continuation of the rotary motion of the carrier-shaft results in a displacement of any carrier-wheel 510 so engaged, which is equal to one tooth. This displacement clearing one tooth of a wheel 510, if the wheel is already positioned for the digit "9," is sufficient to pass a pin 512 on the next carrier-wheel by the nose on the next adjacent trigger 513 and trip and force it out of engagement of its corresponding carrier-ram 515. This ram immediately plunges forward into engagement with its wheel 510, bringing its finger 520 into the path of the next carrying-tooth 523 of the next hub on the carrier-shaft, and here will be seen the reason for having these teeth 523 spirally arranged, so that in the case of adding one to a series of nines indicated on the indicating-wheels, whereby it will become necessary to carry one clear to the extreme left hand, all of the triggers 513 and all of the carrying-rams 515 and engaging cams 523 here come into play successively, each one moving its corresponding wheel one tooth. The last movement of the last wheel takes place at the close of the revolution of the carrying-shaft. The carrying movement necessarily displaces the pivoted member 519 of the carrier-ram by swinging it either downward or upward, as the case may be. At the close of the carrying function of the carrier-shaft the cam 527 on the secondary shaft, geared to the main gear, oscillating the ram-resetting yoke 525 forces back the yoke and with it all of the carrier-rams 515 and brings the shoulders 519$^a$ on the displaced pivot members 519 into engagement with adjacent bars 528, Fig. 12$^h$, which are fixedly mounted in suitable supporting members in a subframe 529, thereby bringing them into their former alinement. A continuation of the movement of this cam 527 releases the yoke 525 for a partial forward movement sufficient to allow the triggers 513 to be again displaced and held out of engagement, which occurs before the carrying functions of the wheels 510 are again brought into play, as above described.

*Printing mechanism.*—The printing devices consist, primarily, of a series of type-wheels 600, mounted upon a main shaft 601, Fig. 5, and a cylindrical platen 602, arranged to be brought into contact with the type-wheels and carrying the paper 602$^a$, Fig. 15$^b$. A suitable printing-ribbon 603 is interposed between the two elements. The type-wheels each have fixedly mounted upon them a spur-gear 604, adapted to be engaged by the teeth of a series of movable toothed segments 605, mounted upon a common shaft 606 and supported between the inner frame members of the machine. Each of these segmental gears has on its side and projecting from it a circular rack 607, composed of pins meshing into one of a series of toothed forks 608, each having a long rearward projection 609 engaging and pivotally connected at 609$^a$ with one of a series of rocking plates 610, mounted upon a common shaft 611 and supported in the same subframe with the gear-segments. Each of this series of plates 610 also has upon the opposite side another pin, 612, pivotally engaging the upper end of one of a series of vertical plunger-bars 613, guided by slots 614 at their lower ends and formed with rearward projections 615 thereupon, the purpose of which will be hereinafter set forth. These plunger-bars 613 are so located as to be in the same vertical planes as the sliding rack-bars 71 and adapted to engage suitable notches or steps 616, formed on the rear ends of the rack-bars. These steps or notches are of such proportions that when the plunger-bars 613 are brought to bear upon them by the pressure of the springs 617, attached to the rocking plates, the type-wheels 600, through the geared segments just described, are brought into the printing positions corresponding to the positions of the respective rack-bars. The rocking plates 610 are controlled in their forward or normal stationary position by a vibrating yoke 618, Fig. 5, mounted on a common center 611 with the rock-plates and having at its left-hand end a pivotal connection by means of a double link 619 with the stop-face gear 620, mounted on a stud 620$^a$ on the left inner frame and meshing with a mutilated gear 621, mounted on the left end of the secondary shaft 527$^a$ of the machine.

In the operation of the machine the first movement toward performing a cycle brings the stop-face gear 620 just mentioned into position to mesh with the teeth on its master-gear 621, retracting the vibrating yoke 618, thus permitting the rock-plates 610 to move under the action of their respective springs 617, carrying with them the pivoted forks 608 and in turn the geared segments meshing with the type-wheels. The distance they are moved is in item-printing limited by the contact of the plungers with the displaced rack-bars. In printing totals it is determined by other means, to be described later. To insure perfect alinement of the type-wheels at this juncture and while the impression is being taken, I provide at the front of the series a swinging yoke 630, Figs. 1, 2, and 5, pivoted at 630$^a$, formed with inwardly-projecting teeth 631 and adapted to engage the teeth of the gears 604 adjacent to the type-wheels. This swinging yoke is connected by a link 631$^a$ with a yielding spring-frame 632, loosely mounted upon a suitable pivot 633, formed by the shaft extending from the outer to the inner frame on which the master-gear 643 is mounted. By a curved upward projection 634 this spring-frame is so arranged as to be operated upon by a friction-roller 635, mounted upon the inner face of a gear-wheel 636, used to drive the impression devices and to be described hereinafter. This spring-frame 632 provides tension sufficient to bring the group of type-wheels 600 into proper alinement and hold them there during the period of impression-taking. The type-wheels 600 being thus positioned and alined are ready to be operated upon by the movable platen 602, which is a rubber-covered roll suitably mounted between vertical uprights 638 on a movable carriage 639, supported by a tilting frame 640, pivotally secured at 641 to the outer frame members in such a way as to swing upward and forward at the time of impression. This swinging motion is imparted by means of a plain spur-gear 642, Fig. 2, on a shaft carried by the right-hand inner and outer frames and meshing with the driving-gear of the secondary driving-shaft and having adjacent to it and fixedly mounted on it a mutilated gear 643, acting upon a suitable stop-face pinion 636 on the right-hand end of a shaft 645, mounted in a frame 646, secured on the rear ends of the inner frame members and having on its left-hand end a crank-arm 647, Figs. 3 and 4, and a suitable adjustable connecting-link 648, connecting it with a projection 649, depending from the pivoted support-brackets of the tilting frame.

*Paper-feeding.*—The feeding of the paper after the impression is made is accomplished by means of a yoke 700, Figs. 2, 3, 5, 15, extending the length of the feed-roll 701 and mounted upon the ends of its bearing. This yoke 700 is engaged at its center by a forward projection 702 on a yoke 703, pivoted on a somewhat smaller yoke 704, having an upwardly-extending arm 705 and being in turn pivotally connected with the main inner members of the frame. The upwardly-extending arm 705 just mentioned is adapted to engage a curved and toothed rack 706, which is secured to a suitable adjustable rod 707, suitably mounted upon auxiliary frame members, which also carry a signaling device hereinafter to be described. The function of the upwardly-extending arm 705 on the main or supporting yoke is to limit the forward motion of the same, and thereby determine the spacing of the paper, whether it be two, three, or four units of space. This is accomplished by setting down the curved and notched rack 706, so that the arm 705 on the main yoke in its forward movement may engage either one of the three separate notches in the rack. The main yoke of the paper-feeding device is provided with a spring 707ª, connected to a depending arm 708 at its right-hand lower end and of sufficient tension to lift it, the yoke, and its attached parts against the notches of the controlling-rack 706.

*Paper-signaling mechanism*, (Figs. 2, 3, 4, 5, 15, 15ª.)—The auxiliary frame members support at their extreme upward and forward ends a pivotal yoke consisting of a bar 720 with rearwardly-extending arms 721, pivoted to the frame and provided with an arm 722, pivotally connected with a vertical rod 723, having a horizontal projection or hammer 724 at its lower end and loosely guided by the frame in such a manner as to come into contact with a bell 725 on being dropped to its lowest position, which is accomplished by means of a spring 726, attached to a pin 727, projecting from the right-hand support of the yoke first mentioned. Fixedly mounted to the ends of the vertical brackets at the ends of the carriage and to the rearward of the circular platen is a plate 728, having parallel with it a plate 729 so arranged as to form a guide or chute for the paper when it is inserted between the feeding-roll and the platen. Upon the plate 728 the rearward of the members forming this guide or chute is affixed by means of suitable brackets, a curved dog, Figs. 15ª, 15ᵇ, having a rearward and heavier portion 731 and a finger 731ª, passing through a cut in the two plates 728 729 in such a manner as to be thrown backward out of the cut, so to speak, when the paper 602ª is inserted, Fig. 15ᵇ. When, however, the paper has passed through sufficiently far so that its end no longer engages the finger 731ª of the dog, the rearward and heavier portion 731 drops down, and thereby comes into engaging position with the angular bar 720 of the signal-yoke during the process of making the impression. The tilting frame 640 being pivoted at 641, it will be seen that the heavier portion 731 of the dog just described when not held up by the paper and during the tilting motion of the carriage describes an arc of a circle which falls within the radius of the bar 720 of the signal-yoke and on the backward motion of the carriage and tilting frame carries down the signal-yoke until the upper corner of the bar slips off the end 720 of the curved dog carried by the carriage and its supporting member. This slipping off allows the spring 726 to force the yoke upward and the vertical rod 723 and hammer downward, causing the bell 725 to vibrate and indicating to the operator that the paper has been exhausted. The arcs in which the end 731 of the dog and the bar 720 of the pivot-frame travel are such that as the bar is depressed by the dog it is withdrawn from the path of the dog, so that it is permitted to rise up quickly beneath the dog.

*Sliding platen support*, (Figs. 2, 3, 4, 5.)—The tilting frame 640, pivotally mounted in the two outside members of the main frame, is provided at its edges with semicircular grooves 650, which correspond with grooves 651 of a like shape in the carriage proper and in which are placed suitable roller-bearings or balls 652, which are so arranged that the carriage may be moved to the right or to the left with a minimum amount of friction. This tilting frame also has on its forward and upward edge a series of notches 653, which may represent any positions in which it may be desirable to place the carriage. These notches are engaged by an arm 654, mounted upon a shaft running in a longitudinal direction with the carriage proper and having at its outer end finger-levers 655 for throwing the arm out of engagement with the notches against the pressure of a suitable spring, if desired. The carriage proper is also provided with a curved plate or paper-guide 657, located at the front of the platen, so that when the paper is inserted from the back and rolled through the rollers it is taken up by the guide and brought forward and upward. At this point a swinging yoke or bail 658, which is mounted on the same center with the movable platen and held in its normal or upright position by suitable springs inclosed in the end brackets, is pressed down by the operator, and a continuation of the movement of the platen bringing forward the paper allows the end of the paper to come inside of the depressed bail in such a way that when the bail is released the paper is turned upward and backward, holding it against the platen and in such a way as to conveniently present the printed item to view. The feeding-yoke, which extends from the extended portions of the feed-roll shaft, is arranged to slide loosely through its engaging member 702, attached to the upper of the two feeding-yokes in such a way that because of its length a lateral displacement of the carriage in no way affects the feeding function of the roll, allowing for the use of one or more columns of printed matter upon paper of suitable width. The length of the bar of the signal-yoke 720 also is such that it is engaged by the end 731 of the dog whatever may be the adjustment of the carriage.

*Zero-printing mechanism*, (Figs. 4, 5, 13 to 15.)—The type-wheels 600 used in printing are each provided on their periphery with one blank space between "0" and "9," which allows for the presentation of the platen 602 in the printing operation without the taking of any impression, thus allowing the machine to be operated without the printing of either zeros or digits. It will be seen from an examination of the keyboard that the cipher is not represented except by the forward space-key and that none of the rack-bars are displaced by the operation of the space-key, which simply acts to shift along the plane of operation from one column to another. In order to allow the type-wheels to be rotated to their blank position where neither cipher nor digit will be printed, the ends of the plungers 613, controlling the type-wheels through the means of the rocking plates 610 and the geared segment, each with its engaging toothed fork 608, are allowed to fall behind the rack-bars 71 when not displaced and a distance below the upper face of the extreme rearward notch thereon represented by two units of distance of their total fall, one unit being represented by each of the notches, one unit corresponding to the zeros, and the second the blanks. It will be seen from this that the ciphers on the type-wheels 600 have no corresponding notch on the rack-bars to bring them into printing alinement, but that such alinement must be brought about by other means. To do this, I provide a shaft 800, Figs. 5, 13, pivoted between the extreme right-hand outer member of the frame and the left-hand inner member of the frame and a cipher-lifting yoke-plate 801, mounted thereupon and sliding through a fixed bracket 802, secured thereto and adapted to engage a downwardly-extending projection 803 on each of the numeral rock-plates 610, Figs. 5, $13^b$, $13^c$. This yoke-plate engages the rock-plates 610 in such a manner that when the shaft 800 and its fixed bracket 802 are rocked forward by means of a cam-engaging arm 804, secured at its right-hand end, and a cam 805, Fig. 2, located upon the secondary shaft $527^a$, the rock-plates 610, with their connecting-forks engaging with the geared segments, throw forward, as it were, the type-wheels 600 from their blank position and bring the ciphers into printing relation with the platen. This cipher-lifting yoke-plate 801 is arranged not only to rock forward and lift the rock-plates, but to slide laterally transversely across the rock-plates and is controlled in such sliding movement by another plate, 806, loosely mounted upon the same shaft, Fig. 13, and arranged to slide thereupon, having at its forward extremity two fingers 807 808, arranged to form a guide with a bar 809, carried by the inner frame and located at the rear of the plungers 613, and also having a slot 810, extending at right angles to the axis of the shaft on which it is hung, the upper finger 807 being sufficiently long to engage with the enlarged portion 615 of the lower end of the plungers 613 when they are not fully depressed, Figs. 14 and $14^b$. If the plungers should all be lowered down to a position representing a blank space on the type-wheels, this forward projection 807 on the plate 806 could pass freely over the enlarged portions 615 of all the plungers and to the right, thereby allowing the cipher-lifting yoke positioned by it to pass so far toward the right side of the machine as to escape engagement with the downward projections on all the rock-plates 610, thereby failing to lift any ciphers into printing position when the shaft 800 is rocked by means of its cam and connecting-arm. This lateral displacement of the two yokes 801 806, forming part of this cipher-lifting mechanism, is controlled by a cam 812 on the secondary driving-shaft 527ª (connected to the cam 805, which is used for the rocking of the shaft 800) through the means of a parallel shaft 813 and an arm 814, Fig. 2, and friction-roller 815, engaging with the cam 812, the parallel shaft having fixedly mounted on or near its center another gear-segment, 816, so arranged as to engage the teeth of another gear-segment, 817, which is pivoted so as to reciprocate in a horizontal plane and having an inwardly-projecting arm 818, with a vertical pin 819, so located as to enter the cut or slot 810 in the projection from the lower sliding yoke 806 on the cipher-lifting shaft. A spring 820, attached to the arm of the horizontal gear-segment and having its other end attached to the right-hand frame of the machine, tends to draw the arm toward the right, and with it its engaging members, consisting of the sliding plate, having the forked ends guided by the rod 809 and the cipher-lifting yoke.

It will be seen from the construction that inasmuch as the projection 807 of this sliding plate projects beyond the enlarged portions 615 of the lower ends of the plungers 613 in case any plunger should not be allowed to fall sufficiently for the finger 807 to pass over its enlarged portion the finger will engage and hold its connected parts from lateral displacement, thereby causing the cipher-lifting yoke when tilted to engage its corresponding number of rock-plates 610 to the right of it, thereby lifting the ciphers into printing position. The number of plates and type-wheels so positioned depends upon which of the plungers has been limited in its downward motion. The first plunger, beginning at the left-hand side of the series, so held from its downward position will interrupt the passage of the sliding plate, Figs. 14, 14ᵇ, thereby holding the cipher-lifting yoke and allowing it to engage all of the plates to the right of said plunger, or rather as many as may represent ciphers in the item to be printed. It will therefore be seen that should any one figure be set up on the item-segments in any one of the several colums any cipher that should appear to the right of it will be brought into printing relation by the action of the devices, the plunger of the figure set up acting to limit the throw of the lifting-yoke. The ciphers to the left of the column containing the first figure set up are not brought into printing position at all.

*Date-printing mechanism*, (Figs. 1, 4ª, 5, 9, 9ª.)—At the left of the main series of nine stops, rack-bars, plungers, rock-plates, and type-wheels are located two series of vertical stops, rack-bars, plungers, rock-plates, and type-wheels representing dating-columns, whereby a date may be used with the item. These rack-bars by their rear notches limit the movements of the plungers in the same manner as do those corresponding to numeral digits, Figs. 1, 4ª. These racks do not engage item-segments, but serve to lock the rack-bars when engaged by the yoke 230 in the same manner as on the other rack-bars. As there are no ciphers indicated on the keyboard, it becomes necessary in the case of a cipher appearing in the date to lift the cipher on the right-hand one of the date-printing wheels into printing position, as in the case of the ordinary item. This is accomplished by means separate and independent from those before described. At the left-hand end of the cipher-lifting shaft I provide a bent arm 821, Figs. 5 and 13, fixedly mounted thereon and carrying a curved hook 822, projecting forward at 822ª and adapted to engage the shortened downward projection 803ª on the rock-plate 610ª, representing the right hand of the dating type-wheels, Fig. 13. This curved hook 822 also has at its upper and rear portion a curved surface 824, which is engaged by a pin 825, projecting from an upwardly-projecting arm 826, loosely mounted upon the parallel cipher-plate-shifter shaft 813 and having at its upper end a curved surface 827, designed to rest upon a pin 828, projecting from the left-hand side of the first dating rock-plate; also at its extreme end a beveled face 829, allowing the arm to move forward in case the pin 828 on the rock-plate should rise to a position indicated by the blank space on the type-wheels coming into printing position. The curved hook 822, mounted on the bent arm of the cipher-lifting shaft, is also provided with a spring 830, which has its lower end engaged with a suitable projection 831 from the lower and rearward extremity of the perpendicular lever 826, which is mounted upon the shifting-shaft. The function of this spring 830 is threefold. First, it operates to keep the curved surface 824 at the rear of the bent hook in contact with the pin 825 on the vertical arm which slides on the pin on the rock-plate, which, should the rock-plate fail to travel its full limit of motion, as in the case of printing one of the digits, the vertical hook and its pin would be stationary by reason of the curved forward face, and the bent hook of the plate, by reason of the spring 830, would be allowed to come into contact with the projection 822ª of the right hand of the two dating rock-plates if that plate came to the position corresponding to the blank space on the type-wheel; secondly, it operates to rock back the cipher-lifting shaft 800 to its normal position after the cam 805 has released it for such motion, and, thirdly, by reason of its connection with the rearward downward extremity of the vertical arm 826 keeps it in contact with the pin 828 on the rock-shaft and in case the left-hand dating rock-plate should rise to a position representing a blank space on its corresponding type-wheel would throw the arm forward, and thereby throw out of the path of the right-hand dating rock-plate the bent hook carried by the arm on the cipher-shifter shaft. This would not interfere with printing any figure that might be set up in the right-hand dating-space, but would prevent the machine printing a zero when no figure at all was desired.

*Total-printing mechanism*, (Figs. 5, 12$^l$, 12$^m$, 16, 16$^c$.)—For printing the total indicated by the accumulator-wheels and their indicators I provide on the gear-segments 605, controlling the type-wheels 600, and near their forward teeth, a series of dogs 850, Figs. 5, 12$^m$, with pivots each passing through the segment and having on its opposite end a lever 851, with its outer end 852 formed at right angles to it and adapted to engage a V-groove 853 in a transverse frame 854, Figs. 5, 12$^m$, mounted upon the two inner frame members of the main frame in such a way that it may be rocked forward and backward and by reason of the angular ends of the levers 851, controlling the dogs 850 on the gear-segments, throw the dogs in or out of the path of the long teeth 605$^b$ of a series of gears 605$^a$, mounted at the side of the gear-segments 605 and upon a common center with them. These gears 605$^a$ are formed in this particular case with thirty teeth, one in every ten of each, or three teeth 605$^b$, being elongated and projecting beyond the arc described by the remainder of the teeth. These gears mesh directly with the accumulator-wheels 300, Figs. 5, 12$^m$, and the long teeth being arranged in the multiple of ten are assembled so that a dog 850 when in contact with the long teeth will position the corresponding type-wheel 600 so as to present to the printing-platen a figure corresponding to its accumulator-wheel and indicated in its respective column. The transverse frame 854, having the V-groove in its upper surface and having recesses into which the forward part of the gear-segments 605 enter, is controlled in its forward-and-backward motion by a pivotally-connected link 855 at the right hand of the inner main frame, which extends downward and backward and connects with another transverse swinging frame 856, pivoted between the main inner frames and located at the rear of the rack-bars 71 and having its forward projection 857 so arranged as to be moved up into the path of the sliding rack-bars. This frame is connected at its left-hand end with a link 858, having at its forward end a slotted connection 859, with a locking-lever 860, which is pivoted between the outer and inner left-hand frames, Fig. 16. The upper end of this locking-lever having a U-shaped slot 861 is so arranged as to provide a channel in which a pin 862, projecting from the forward arm of the controller, may freely move. The lower end of this locking-lever not only furnishes a connection for the slotted end of the link 858, connecting with the movable frame 856, but also for a connection with the rear end of the horizontal push-rod 863, having at its front end a suitable button, (totalizing-key.)

The purpose of the parts here described, generally speaking, is to shift the control of the type-wheels 600 in their printing functions from the rear ends of the horizontally-moving rack-bars 71 to the accumulator-wheels 300, which it is necessary to do in the printing of a total. The push-rod 863 (indicated at the left-hand side of the keyboard) operates to move the dogs 850, pivoted to the gear-segments 605, operating the type-wheels 600 through the means of the locking-lever directly connected to the push-rod, whose U-shaped slot operates to necessitate a full and complete movement of the same by furnishing when out of position a positive lock for the controller which controls the spring-drum and its connecting parts. The push-rod 863, through the medium of the slotted link 859 at the right-hand side of the locking-lever and at the left of one of the central frames, also operates to throw up the swinging frame at the rear of the rack-bars, which would be prevented from such movement should any one of the rack-bars be positioned for printing an item. This V-grooved transverse frame 854 also has at its right-hand end a depending arm 308, Fig. 16$^c$, which operates to throw up the cam-engaging member of the accumulator justifier-yoke 303, which brings the justifier into locking position with the accumulator-wheels, and thereby prevents any displacement of the accumulator-wheels while the total is being printed.

*Repeating mechanism*, (Figs. 2, 4$^a$, 10, 10$^a$, 10$^b$, and 11.)—At the right-hand side of the keyboard, Fig. 4$^a$, I supply a key R to provide for the repeating of any item set up as many times as desired. This key has a lever 875, Fig. 10, pivoted on a common shaft 101 with the numeral-keys. It extends to the rear and has its end turned at right angles to form a lifting-finger 876, which passes under a projection 877, Fig. 11, on a transverse yoke 219$^a$, pivoted on the resetting rock-shaft and passing under the forward end of the stop-lock-resetting yoke-hook 217. This has also at its rearward end a forwardly-projecting finger 879, which passes under a pin 880, secured in the forward end of the resetting bell-crank beam 202, which can thereby be lifted out of engagement with the point of the arm 204, secured to the T-lever shaft 205 in such a way as to pass over the top of the arm 204, and thereby avoid the movement of the T-lever shaft 205, which would ordinarily occur at the close of a cycle of the machine. The pressing of the repeat-key not only lifts this resetting-beam 202, but also lifts the transverse yoke 219$^a$, which in turn lifts and throws out of engagement the hook 217, connected with the depending arm of the stop-lock yoke 214, allowing the movement of the curved finger 215, engaging with the lugs 201 on the main drive-gear at the right hand of the machine and its connecting parts without the throwing down and repositioning of the stop-lock mechanism. It will therefore be seen that in the operation of the machine if two or more items of the same value occur the operator having once set up the item can by pressing the repeat-key R continue to operate the hand-crank 26 or the foot-lever and sucessively add and print the item without the further manipulation of the keys, this resulting from throwing out of engagement, first, the hook 217, actuated by the bent finger 215 at the right of the machine, which prevents the throwing down of the stop-locks, and, second, from disconnecting the beam 202 from the arm 204 on the T-lever shaft, preventing the operation of resetting devices acting to replace the rack-bars in their normal position.

*Abbreviation-setting mechanism*, (Figs. 3, 7$^d$, 9, and 17$^d$.)—At the left of the series of the eleven type-wheels and close to the wheels used for printing the date I provide an endless chain 900, Fig. 17$^d$, composed of suitable separable links 900$^a$, meshing with a sprocket-wheel 901, mounted on a common shaft with the type-wheels, and with a sprocket-wheel 902, mounted upon a shaft 903, journaled in the left-hand inner frame, said chain having on the outer surfaces of its links suitable type-faces 904 and indicating-labels 905. The larger of the two wheels acts as the driving member of the chain. Fixedly mounted to the driving-shaft and at the left-hand of the inner frame I provide a hub 906, carrying two ratchet-wheels 907 908, one, 907, provided with twice as many teeth as there are printing-faces 904 on the chain and adapted to engage a spring-detent 909, fixed to the left hand of the ribbon-bracket 910. The purpose of the teeth on this detent 907 is to aline the chain 900 in its printing position or aline it in its non-printing position, which position is half-way between what we may call for the purpose of illustration the "first" and "second" printing positions. The other ratchet-wheel, 908, is arranged to be engaged by the nose 911 on a long slotted dog 912, Figs. 3 and 17$^d$, whose forward end projects downward and is pivotally connected with a key 913 at the left hand of the keyboard. The teeth of this ratchet are so arranged that a depression of the key 913 and the bringing of the dog 912 into engagement with the wheel moves the printing-chain 900 into printing position, whether the same has been thrown off its printing position or whether it is desirous of moving it from one printing position to another. The throwing out of the printing position of the chain is accomplished automatically at every cycle of the machine. This is for the evident reason that it is seldom necessary and often objectionable to print the same sign or abbreviation twice in succession. To do this, I provide a swinging arm 914, mounted upon a stud 915 on the left-hand inner frame of the machine, its upper end carrying a pivoted dog 916 and a stop-pin 917 for the same and at its lower end having a point 918, which normally lies in the path of a pin 919, located on the mutilated driving-gear 920 at the left-hand end of the secondary shaft and being provided with a notch 921, sitting over a pin 922, projecting from the main frame, designed to limit it in its motion. A movement of the mutilated gear 920, which occurs at every cycle of the machine, by reason of its projecting pin 919 throws backward the lower end of the swinging arm 914 and brings the dog 916, located at its upper and forward end, into engagement with one of the teeth on the ratchet-wheel 908 last described, which is also engaged by the long slotted pawl 912, connected with the key 913. This movement of the swinging arm 914 is sufficient to move the ratchet-wheel 908, which has the adjacent ratchet detent-wheel 907 secured with it to the shaft, one tooth of the detent-wheel 907, which brings the chain 900 to its intermediate position, where it will not be engaged by the printing-platen. This movement, which is accomplished automatically, does not in any way interfere with the operation of the chain and its connected parts. The shaft upon which the ratchets and driving-sprockets are mounted extends toward the left hand and has mounted upon it a suitable knob 923 for its manual operation.

*Ribbon devices*, (Figs. 1, 3, and 17.)—As has been before mentioned, the printing devices as embodied in this machine are to be used with the ordinary inking-ribbon wound upon suitably-mounted spools at either the left or the right of the machine. These spools 950 are revolubly mounted on upwardly-projecting pins 951 and are provided at their tops with frictional contact-plates 952, held in place by nuts 953 and designed to supply the proper amount of frictional resistance. At their bottom edges they are provided with suitable ratchet-teeth 955, Fig. 17, engaged by ratchet-pawls 956, pivoted at 956$^a$, and so arranged and connected that only one of them is in engagement with the teeth of ratchet-wheels at any given time. These pawls 956 are mounted in swivel-pins 957, entering the lower extremity of either of two arms 958, fixed upon a common shaft 959. This common shaft 959 has at its left-hand end an operating-arm 960, connected, by means of a link 961, to a projection 962 upon a slotted lever 963, mounted upon a common stud 915, with the automatic throwing-out arm 914, used for throwing out of position the dating-chain. The slotted portion of this lever passes over a pin 964, which is mounted on the outer side of the mutilated gear 920 at the left-hand end of the secondary shaft. The ribbon-spool-actuating pawls 956 are also each provided at their forward end with a bent hook 965, which when the ribbon is completely unwound from either of the two spools is adapted to engage with the bent forward end of a movable spring-pressed finger 967, which bears upon the periphery of the roll of ribbon. Such engagement takes place while the shaft 959 and its arms carrying the ribbon-spool dogs 956 is in its forward position, it being understood that this shaft has a rocking motion, and the backward movement carries the one of the dogs 956 so engaged into engaging position with the ratchet-teeth on the spool from which the ribbon has been unwound by reason of the relative position of the point of the curved hook 965 on the forward end of the dog and the pivot 956, by which it is supported. At the rear and toward the point of the dogs is pivotally secured either end of a bent connection 968, which has at its central and forward portion an angular stud 969, adapted to engage the V-shaped corner 970 of a bow-spring 971, supported at the ends by studs 972 in the extreme forward ends of the dogs 956, and so adjusted that the V-shaped projection at its center, acting against the stud 969, furnishes a yielding contact for either of the ribbon-spool dogs with its respective ratchet. Whenever one dog is moved into engagement with the ratchet-teeth of one spool, the movement is transmitted through this bent connection and the other dog is disengaged from the ratchet-teeth on the other spool.

*Accumulator-resetting device.*—To reset the accumulator-wheels to the zero-point, I provide on the shaft upon which they are mounted a series of flanges 980, Fig. 12$^a$, and a recess 981 on the inner right-hand surface of the accumulator-wheels. Between the flange and the accumulator-wheels I interpose a suitable friction-washer 982, which provides enough friction not only to hold the accumulator-wheels from displacement, but to carry them with the shaft, Figs. 1 and 3, and flanges when the same are turned by means of the knob 983 at the left-hand extension of their shaft. I also provide on the shaft at the left of the inner frame a flanged collar 984, Fig. 6, having on its periphery an angular cut 985, adapted to engage the forward extension 985$^a$ of a bent arm 986, pivoted at 986$^a$ and provided with a downwardly-projecting lug 987, adapted to support the rear end of a spring 13$^a$, the forward end of which is secured to a hook upon the controller 13. This spring serves to force the bent arm into engagement with the notched collar and also to cause the controller to engage the notches 11 11 in the spring-drum. The extreme rearward projection of this bent arm 986 is formed with a notch 988 and engages a pin 989, extending from a movable cross-frame or locking-yoke 989$^a$, Fig. 5, into which, in suitable notches being provided therefor, extend the upper ends of the carrier-triggers 513. This frame by means of the fork at the rear end of the accumulator-resetting locking-arm is moved into active engagement with the upper ends of the trigger-plates in such a way as to prevent their being displaced by the action of the pins 512, Figs. 5 and 12$^c$, upon the carrying-wheels while the accumulator-wheels are being reset. It will now be seen that a movement of the accumulator-shaft will, because of the friction-washers 982, result in a movement of the accumulator-wheels, which is transmitted to the carrying-wheels. This movement will also result in a throwing out of the accumulator-locking arm 986 from its notch 985 in the flanged hub and the throwing into engagement of the locking-yoke 989$^a$ at the top of the trigger-plates, which prevents the rearward displacement of the trigger-plates. A continuation of the movement of the accumulator-shaft brings the pins 512 one after another or simultaneously, as the case may be, into engagement with the forward projections of the triggers 513 and limits their motion, the triggers being unable to recede by reason of the lock 989$^a$. This position is so calculated as to bring into line at the sight-opening all of the zeros carried by the indicators, one revolution of the accumulator-shaft being necessary to bring them to the proper position. This being accomplished, the accumulator-locking arm 986 inserts its hooked end into the angular cut 985 in the flanged hub and holds the accumulator-shaft and hubs in a stationary position during the following calculations. Whenever the hooked end 985, Fig. 6, is not in the slot of the locking-disk 984, the face 985$^a$ on the accumulator-locking lever 986 comes into the path of an arm 990 upon the controller 13, locking the controller from movement. This arm 990 upon the controller when the machine is in the midst of a cycle likewise engages the face 985$^a$ and blocks the arm 986, thus preventing the turning of the shaft to reset the accumulator-wheels.

In order to prevent the machine from operating too rapidly after the controller has released the main driving-shaft, a centrifugal brake or governor 991, Figs. 4, 17$^b$, 17$^c$, is provided mounted upon a shaft 992 in the rear of the machine, which is connected to the main driving-shaft 5 by multiplying-gearing 993, and acts to retard the speed of the parts.

What I claim is—

1. In a computing-machine, the combination of item-setting mechanism and item-printing mechanism, and means for potentially setting up a new item during the operation of the item-printing mechanism.

2. In a computing-machine, the combination of item-setting mechanism and accumulating mechanism, and means for potentially setting up a new item during the operation of the accumulating mechanism.

3. In a computing-machine the combination of item-setting devices, accumulating devices, means for transferring the items set up by the item-setting devices to the accumulating devices and means for potentially setting up a new item during the operation of transferring.

4. In a computing-machine the combination of item-setting devices, accumulating devices, means for causing the machine to perform a cycle, means for potentially setting up a new item as soon as a cycle has been begun.

5. In a computing-machine the combination of item devices, key-controlled stops for the same, accumulating devices, cycle-performing devices for transferring items set up on said item devices to said accumulating devices, means for withdrawing said stops at the beginning of a cycle and means for resetting said stops for a new item during the cycle.

6. In a computing-machine, the combination of means for setting up an item, power-impelled means for accumulating said item, means for potentially setting up a new item, means for restoring the item devices to their normal positions and releasing those corresponding to the columns of the new item so as to permit them to automatically return to positions corresponding to the item potentially set up.

7. In a computing-machine, the combination of means for setting up an item, power-impelled means for accumulating and printing said item, means for potentially setting up a new item, means for restoring the item devices to their normal positions and releasing those corresponding to the columns of the new item so as to permit them to automatically return to positions corresponding to the item potentially set up.

8. In a computing-machine, the combination of means for setting up an item, power-impelled means for printing said item, means for potentially setting up a new item, means for restoring the item devices to their normal positions and releasing those corresponding to the columns of the new item so as to permit them to automatically return to positions corresponding to the item potentially set up.

9. In a computing-machine the combination of item devices, key-controlled stops for the same, accumulating devices, cycle-performing devices for transferring items set up on said item devices to said accumulating devices, means for locking said item devices during said cycle, means for withdrawing said stops at the beginning of a cycle and means for resetting said stops for a new item during the cycle.

10. In a computing-machine the combination of item-setting devices, stops therefor, means for setting said stops, accumulating devices, means for transferring the items set up to said accumulating devices, means for withdrawing said stops at the beginning of said transferring operation, means for resetting said stops during said operation, means for restoring all retracted rack-bars and automatically releasing all rack-bars corresponding to the stops set up during said cycle.

11. In a computing-machine, the combination of means for setting up an item, power-impelled means for accumulating said item, means for potentially setting up a new item, means for restoring the item devices to their normal positions and releasing those corresponding to the columns of new items so as to permit them to automatically return to positions corresponding to the item potentially set up.

12. In a computing-machine the combination of a series of rack-bars, a corresponding number of series of stops therefor, means for releasing said rack-bars progressively, and means for actuating one of the stops of the series corresponding to the rack-bar released, means for performing a cycle, means for locking said rack-bars during said cycle and means for withdrawing said stops at the beginning of said cycle.

13. In a computing-machine the combination of item devices, springs for impelling the same, numeral-keys, stops actuated by said numeral-keys for limiting the movement of said item devices, means for releasing said item devices, cycle-performing apparatus for accumulating said items, means for locking said item devices during the performance of such cycle, means for retracting said stops at the beginning of said cycle, and means whereby such stops may be reset during the remainder of said cycle, and means for restoring and releasing said item devices at the end of said cycle.

14. In a computing-machine, the combination of sliding rack-bars, springs for impelling the same, numeral-keys, stops actuated by said numeral-keys for limiting the movement of said rack-bars, means for releasing said rack-bars, cycle-performing apparatus for accumulating said items, means for locking said rack-bars during the performance of such cycle, means for retracting said stops at the beginning of said cycle, and means whereby such stops may be reset during the remainder of said cycle, and means for restoring and releasing said rack-bars at the end of said cycle.

15. In a computing-machine, a series of item devices, a plurality of series of separately-movable stops, manually-operated means for actuating any stop in any series, all of said manually-operated means being capable of actuating stops in any series and releasing the item device corresponding to that series.

16. In a computing-machine the combination of a plurality of lifters, a plurality of series of stops normally out of alinement with said lifters, means for moving the stops of one series into alinement with said lifters and means for actuating any one of said lifters.

17. In a computing-machine, the combination of a plurality of yokes, a plurality of series of stops normally out of alinement with said yokes, means for moving the stops of one series into alinement with said yokes and means for actuating any one of said yokes.

18. In a computing-machine, the combination of a selector mechanism, a spring acting to move said selector mechanism and means for automatically moving it backward to its original position and means for automatically advancing it to a point determined for all items prior to the setting up of any item.

19. In a computing-machine, the combination of a selector mechanism, a spring acting to move said selector mechanism and means for automatically moving it backward to its original position and means for automatically advancing it to a position determined for all items prior to the setting up of any item and thereafter advancing it step by step, a variable stop for determining said position and means for maintaining said stop unchanged during the setting up of successive items.

20. In a computing-machine, the combination of a revolving selector mechanism, a traveling indicator revolving therewith, a spring acting to revolve said selector mechanism and traveling indicator, and means for automatically revolving them backward to their original positions.

21. In a computing-machine, the combination of a selector mechanism, a traveling indicator moving therewith, a spring acting to move said selector mechanism and traveling indicator, and means for automatically moving them backward to their original positions and means for automatically advancing them to a predetermined position, a variable stop for determining said position and means for maintaining said stop unchanged during the setting up of successive items.

22. In a computing-machine, the combination of a selector mechanism, a traveling indicator moving therewith, a spring acting to move said selector mechanism and traveling indicator, and means for automatically moving them backward to their original positions and means for automatically advancing them to a predetermined position and thereafter advancing them step by step, a variable stop for determining said position and means for maintaining said stop unchanged during the setting up of successive items.

23. In a computing-machine, the combination of a selector mechanism having a revolving shaft, a traveling indicator revolving therewith, a spring acting to revolve said selector mechanism and traveling indicator, and means for manually restoring them to their original positions by a backward movement independently of the cycle of the machine.

24. In a computing-machine, the combination of a selector mechanism, a traveling indicator moving therewith, a spring acting to move said selector mechanism and traveling indicator, and means for manually restoring them to their original positions by a backward movement, and means for automatically advancing them to a predetermined position, a variable stop for determining said position and means for maintaining said stop unchanged during the setting up of successive items.

25. In a computing-machine, the combination of a selector mechanism, a traveling indicator moving therewith, a spring acting to move said selector mechanism and traveling indicator, and means for manually restoring them to their original positions by a backward movement, and means for automatically advancing them to a predetermined position, and thereafter advancing them step by step, a variable stop for determining said position and means for maintaining said stop unchanged during the setting up of successive items.

26. In a computing-machine, the combination of a selector mechanism, a spring acting to move said selector mechanism, means for manually restoring it to its original position by a backward movement and means for automatically advancing it to a predetermined position and thereafter advancing it step by step, a variable stop for determining said position and means for maintaining said stop unchanged during the setting up of successive items.

27. In a computing-machine, the combination of a selector mechanism, a traveling indicator moving therewith, a spring acting to move said selector mechanism and traveling indicator, and means for manually and for automatically restoring them to their original positions by a backward movement.

28. In a computing-machine, the combination of a selector-shaft, a traveling indicator moving therewith, a spring acting to move said selector-shaft and traveling indicator, and means for manually and for automatically restoring them to their original positions by a backward movement.

29. In a computing-machine, the combination of a series of numeral-keys, a selector mechanism, a spring acting to propel the same, means for permitting said mechanism under the impulse of said spring to move one step upon the depression of any numeral-key, means for moving said mechanism backward to its original position, a series of stops for stopping said mechanism at some point in its forward movement, means for releasing the active stop of said series upon the first numeral-key operation and means for holding the step-by-step mechanism out of action until after such release.

30. In a computing-machine, the combination of a series of item devices, a corresponding number of series of stops, and means for actuating any one stop of the series of stops corresponding to a given item device and releasing that item device, each of said means being capable of actuating a corresponding stop in any one of the said series of stops.

31. In a computing-machine the combination of a series of rack-bars, a corresponding number of series of stops, and means for actuating any one stop of the series of stops corresponding to a given rack-bar and releasing that rack-bar, said means all being common to each of said series of stops.

32. In a computing-machine, the combination of a series of spring-retracted rack-bars, a corresponding number of series of vertically-movable stops, and means for actuating any one stop of the series of stops corresponding to a given rack-bar, said means all being common to all of said series of stops, and means for releasing that rack-bar.

33. In a computing-machine, the combination of a series of rack-bars, a corresponding number of series of stops, lifters corresponding in number to the stops in one series, means for moving the stops of each series progressively into operative position relatively to the said lifters, and means for actuating said lifters so as to operate upon a stop of the series corresponding to any rack-bar which may be released and means for releasing said rack-bar.

34. In a computing-machine, the combination of a series of rack-bars, a corresponding number of series of stops, yokes corresponding in number to the stops in one series, means for moving the stops of each series progressively into operative position relatively to the said yokes, and means for actuating said yokes so as to operate upon a stop of the series corresponding to any rack-bar which may be released and means for releasing said rack-bar.

35. In a computing-machine, the combination of a series of sliding rack-bars, a series of springs for retracting the same, a corresponding number of series of vertically-movable stops, a plurality of lifters corresponding to the number of stops in any one series, a series of numeral-keys corresponding respectively to said lifters, means for successively bringing the stops of the several series into operative position relatively to said lifters, connections between the said numeral-keys and said lifters whereby the lifters may be operated to actuate said stops, and means for releasing the rack-bar corresponding to said stop actuated.

36. In a computing-machine, the combination of a series of sliding rack-bars, a series of springs for retracting the same, a corresponding number of series of vertically-movable stops, a plurality of lifting-yokes corresponding to the number of stops in any one series, a series of numeral-keys corresponding respectively to said yokes, means for successively bringing the stops into operative position relatively to said yokes, connections between the said numeral-keys and said yokes whereby the yokes may be operated to actuate said stops, and means for releasing the rack-bar corresponding to the said stop actuated.

37. In a computing-machine, the combination of a series of sliding rack-bars, a series of springs for retracting the same, a corresponding number of series of vertically-movable stops, a plurality of lifters corresponding in number to the stops in any one series, a series of numeral-keys, means controlled by said keys for moving the stops of one of said series into operative relation relatively to said lifters, means for actuating said lifters through said keys so as to elevate the corresponding stop of said series, and means actuated by the elevated stop for releasing the rack-bar corresponding to that series.

38. In a computing-machine, the combination of a series of sliding rack-bars, a series of springs for retracting the same, a corresponding number of series of vertically-movable stops, a plurality of yokes corresponding in number to the stops in any one series, a series of numeral-keys, means controlled by said keys for moving the stops of one of said series into operative relation relatively to said yokes, means for actuating said yokes so as to elevate the corresponding stop of said series, and means actuated by the elevated stop for releasing the rack-bar corresponding to that series.

39. In a computing-machine, the combination of an item device, a retracting-spring therefor, a series of movable stops in the path of said item device, a series of numeral-keys corresponding to the stops in said series, means for throwing said keys and stops into and out of operative relation, each of said keys when in operative relation, upon being depressed, acting to position its stop and to release said item device.

40. In a computing-machine, the combination of a sliding rack-bar, a retracting-spring therefor, a series of vertically-movable stops in the path of said rack-bar, a series of numeral-keys corresponding to the stops in said series, means for throwing said keys and stops into and out of operative relation, each of said keys when in operative relation, upon being depressed, acting to position its stop and to release said item device.

41. In a computing-machine the combination of a series of item devices, a series of springs for retracting the same, a corresponding number of series of movable stops, a plurality of stop-actuating devices corresponding in number to the stops in any one series, a corresponding number of movable plates moving said stops into and out of operative relation with said stop-actuating devices, means for progressively shifting said sliding plates, a series of numeral-keys corresponding to said stop-actuating devices, and connections between said stop-actuating devices and said numeral-keys.

42. In a computing-machine, the combination of a series of sliding rack-bars, a series of springs for retracting the same, a corresponding number of series of vertically-movable stops, a plurality of stop-actuating yokes corresponding in number to the stops in any one series, a corresponding number of sliding plates moving said stops into and out of operative relation with said yokes, means for progressively shifting said sliding plates, a series of numeral-keys corresponding to said yokes, and connections between said yokes and said numeral-keys.

43. In a computing-machine, the combination of a series of movable item devices, a pawl for each item device and carried thereby, an abutment for said pawls, means for disengaging said pawls from said abutment, and stops for limiting the movement of the item devices thus freed, means for actuating said stops, the means for actuating the stops corresponding to one item device being common to the means for actuating stops of other item devices.

44. In a computing-machine, the combination of a series of sliding rack-bars, a pawl for each rack-bar and carried thereby, an abutment for said pawls, means for disengaging said pawls from said abutment, and stops for limiting the movement of the rack-bar thus freed, means for actuating said stops, the means for actuating the stops corresponding to one item device being common to the means for actuating stops of other item devices.

45. In a computing-machine, the combination of a series of movable item devices, a series of retracting-springs therefor, a series of pawls one connected to each item device, an abutment for said pawls, a corresponding number of series of stops adapted to engage said pawls, means for elevating a stop of any series during one cycle and simultaneously releasing the restraining-pawl of the corresponding item device, means for holding the stop and pawl-releasing device in operative position until the beginning of the next cycle.

46. In a computing-machine, the combination of a series of sliding rack-bars, a series of retracting-springs therefor, a series of pawls one connected to each rack-bar, an abutment for said pawls, a corresponding number of series of stops adapted to engage said pawl, means for elevating a stop of any series during one cycle and simultaneously releasing the restraining-pawl of the corresponding rack-bar, means for holding the stop and pawl-releasing device in operative position until the beginning of the next cycle.

47. In a computing-machine, the combination of a series of movable item devices, a series of retracting-springs therefor, a series of pawls one connected to each item device, an abutment for said pawls, a corresponding number of series of stops adapted to engage said pawls, means for elevating a stop of any series and simultaneously releasing the restraining-pawl of the corresponding item device, means for holding the stop and pawl-releasing device in operative position until the beginning of the next cycle, means for retracting the stop at the beginning of a cycle, and means for holding the item device in the positions theretofore defined by the stops until the close of the cycle.

48. In a computing-machine, the combination of a series of sliding rack-bars, a series of retracting-springs therefor, a series of pawls one connected to each rack-bar, an abutment for said pawls, a corresponding number of series of stops adapted to engage said pawls, means for elevating a stop of any series and simultaneously releasing the restraining-pawl of the corresponding rack-bar, means for holding the stop and pawl-releasing device in operative position until the beginning of the next cycle, means for retracting the stop at the beginning of a cycle, and means for holding the rack-bars in positions theretofore defined by the stops until the close of the cycle.

49. In a computing-machine, the combination of a series of sliding rack-bars, a series of retracting-springs therefor, a series of pawls one connected to each rack-bar, an abutment for said pawls, a corresponding number of series of stops adapted to engage said pawl, means for elevating a stop of any series and simultaneously releasing the restraining-pawl of the corresponding rack-bar, means for holding the stop and pawl-releasing device in operative position until the beginning of the next cycle, means for holding the rack-bars in the position theretofore defined by the stops until the close of said cycle, and means for restoring the rack-bars to their original positions substantially at the close of a cycle.

50. In a computing-machine, the combination of a series of moving item devices, a series of retracting-springs therefor, a series of pawls one connected to each item device, an abutment for said pawls, a corresponding number of series of stops adapted to engage said pawl, means for elevating a stop of any series and simultaneously releasing the restraining-pawl of the corresponding item device, means for holding the stop and pawl-releasing device in operative position until the beginning of the next cycle, means for holding the item devices in the position theretofore defined by the stops until the close of said cycle, and means for restoring the item devices to their original positions substantially at the close of a cycle and withdrawing said restoring means.

51. In a computing-machine, the combination of a series of vertically-movable stops, a series of stop-locking bars acting to lock in operative position any stop which may have been actuated, and a series of rack-bars released by said stop-locking bars and when released engaging said stops.

52. In a computing-machine, the combination of a series of vertically-movable stops, a series of stop-locking bars acting to lock in operative position any stop which may have been actuated, cycle-performing mechanism and means for unlocking said stops at the beginning of a cycle of said mechanism.

53. In a computing-machine, the combination of a sliding rack-bar, a retaining-pawl connected thereto, a releasing-plate actuating said retaining-pawl, a series of stops, each one adapted to operate said releasing-plate and to limit the movement of said rack-bar, a series of numeral-keys each adapted to operate one of said stops.

54. In a computing-machine, the combination of movable item devices, stops for limiting the motion of the same, a lever controlling said stops, a lever for resetting said item devices, cycle-performing mechanism, and cams acting to move said first-mentioned lever at the beginning of the operation of said cycle-performing mechanism and said last-mentioned lever at the end of said operation.

55. In a computing-machine, the combination of sliding rack-bars, stops for limiting the motion of the same, a lever controlling said stops, a lever for resetting said bars, cycle-performing mechanism, and cams acting to move said first-mentioned lever at the beginning of the operation of said cycle-performing mechanism and said last-mentioned lever at the end of said operation.

56. In a computing-machine, the combination of sliding rack-bars, stops for limiting the motion of the same, pawls for retaining said bars in the positions limited, a lever controlling said stops, a lever releasing said pawls, a lever for retracting said bars, a cycle-performing apparatus, and cams actuated by the cycle-performing apparatus for successively actuating said levers.

57. In a computing-machine, the combination of a series of type-wheels carrying type-surfaces corresponding to the digits in regular order and a blank surface, means for holding the same normally with the nines in printing position, and means for retracting the same respectively an amount sufficient to bring the desired one of said type and blank surfaces on each of said wheels into printing position.

58. In a computing-machine, a series of type-wheels each having eleven positions relatively to the printing-line, including a zero and blank position, means for normally holding said type-wheels with the nines in printing position, means for retracting the type-wheels corresponding to the respective numerals to be printed an amount corresponding to the said numerals, means for retracting the other type-wheels so as to bring their blanks into the printing-line, means for advancing the type-wheels to the right of the first digit to be printed so as to bring their zeros into printing position.

59. In a computing-machine, a series of type-wheels each having eleven positions relatively to the printing-line, including a zero and blank position, means for normally holding said type-wheels with the nines in printing position, means for retracting the type-wheels corresponding to the respective numerals to be printed an amount corresponding to the said numerals, means for retracting the other type-wheels so as to bring their blanks into the printing-line, a slide-lever for advancing the type-wheels to the right of the first digit to be printed so as to bring their zeros into printing position.

60. In a computing-machine, the combination of a series of type-wheels which have, in addition to faces for printing digits, zero, and blank printing faces, means for causing said wheels corresponding to the actuated numeral-keys, to revolve a corresponding distance, means for causing the remaining wheels to present one of said two faces to the printing-line, means for causing the said remaining wheels on one side of the left-hand digit-printing wheel to revolve so as to present the other of said two faces to the printing-line during the impression-taking period.

61. In a computing-machine, the combination of a series of type-wheels having eleven positions relatively to the printing-line, two of which are zero and blank positions, numeral-keys for positioning some or all of said wheels, means for revolving the wheels not so positioned to the blank-printing position, means for retracting the blank-positioned wheels to the right of the first left-hand-positioned wheels, so as to bring their zero-printing faces in the printing-line.

62. In a computing-machine, the combination of a plurality of rack-bars, a plurality of type-faces controlled thereby, each having a zero face and a blank face thereon, means for retracting some of said type-faces so as to present one of said two faces to the printing-line, means for moving the type-faces corresponding to the so-retracted rack-bars on one side of the rack-bar not so retracted from said retracted position so as to present the other face to the printing-line, said means being controlled by the position of the said rack-bar not so retracted.

63. In a computing-machine, the combination of a plurality of item devices, a plurality of type-faces controlled thereby, each having a zero-face and a blank face thereon, means for retracting some of said type-faces so as to present one of said two faces to the printing-line, means for moving the type-faces corresponding to the so-retracted item devices on one side of an item device not so retracted, from said retracted position so as to present the other face to the printing-line, said means being controlled by the position of the said item device not so retracted.

64. In a computing-machine, the combination of a plurality of sliding rack-bars, type-segments having zero and blank faces adapted to be controlled thereby, and additional means for controlling one of said type-segments when it is not controlled by one of said bars so as to shift one of said faces from and the other into the printing-line, said means being controlled by the next bar.

65. In a computing-machine, the combination of a plurality of sliding item devices, type-segments having zero and blank faces adapted to be controlled thereby, and additional means for controlling one of said segments when it is not controlled by one of said item devices so as to shift one of said faces from and the other into the printing-line, said means being controlled by the next item device.

66. In a computing-machine, the combination of type-segments having ten printing-surfaces and one blank space, means for normally positioning the printing-surface at one end of the segments in the printing-line, means for advancing said segments so as to present the blank spaces to the printing-line, and means for retracting the segments corresponding to the zeros to be printed so as to bring their zeros into printing-line, and means for causing an impression to be taken while the zeros are so positioned.

67. In a computing-machine, the combination of type-segments having nine numeral-printing surfaces and one zero and one blank space, means for normally positioning the printing-surface at one end of the segments in the printing-line, means for positioning said segments to print the digits of an item, means for advancing the remaining segments so as to present one of said two spaces to the printing-line, and means for then moving the segments on one side of the left-hand digit set up so as to bring the other space into the printing-line, and means for causing an impression to be taken while the segments are so positioned.

68. In a computing-machine, the combination of type-segments having nine numeral-printing surfaces and one zero and one blank space, means for normally positioning the printing-surface at one end of the segments in the printing-line, means for positioning said segments to print the digits of an item, means for advancing the remaining segments so as to present one of said two spaces to the printing-line, and a slide positioned by the means for actuating the left-hand digit-printing segment for then moving the segments on one side of the left-hand digit set up so as to bring the other spaces into the printing-line, and means for causing an impression to be taken while the segments are so positioned.

69. In a computing-machine, the combination of a plurality of printing-segments arranged side by side having ten printing-surfaces and one blank space, means for normally positioning said printing-segments so that the nines shall be in the printing-line, means for advancing such segments as represent digits so as to bring the desired numerals in the printing-line, means for advancing the balance of said segments so as to bring one of the two non-digital spaces in the printing-line, and means for further positioning the printing-segments on one side of the left-hand digital segment so as to present the other non-digital space to the printing-line.

70. In a computing-machine, the combination of cycle-performing devices, accumulating-wheels actuated thereby, an alining device coöperating with said accumulating-wheels, and a multiple cam for causing said alining device to act upon said accumulating-wheels at a plurality of definite periods in each cycle.

71. In a computing-machine, the combination of a series of type-faces, means for bringing them into printing position side by side, a tilting platen, a yoke for elevating the same, and means for adjusting the platen laterally, a tilting yoke moving laterally therewith, means actuated thereby for revolving said platen, and means engaging and actuating said tilting yoke in any one of its lateral positions.

72. In a printing computing-machine the combination of an alarm, a striker therefor, means for actuating said striker during each operation of the machine occurring after the paper is exhausted, said means being controlled by the paper.

73. In a computing-machine, the combination of a platen, a guide for the paper, a trip carried by said guide and controlled by said paper, a yoke adapted to be actuated by said trip when disengaged by said paper, and an alarm operated by said yoke when actuated by said trip.

74. In a computing-machine, the combination of a laterally-movable platen, a guide for the paper moving therewith, a trip carried by said guide and controlled by said paper, a yoke adapted to be actuated by said trip when disengaged by said paper, and a hammer operated by said yoke when actuated by said trip in any lateral position of said platen, and an alarm located so as to be hit by said hammer when operated.

75. In a computing-machine, the combination of a series of item-segments, a cradle therefor having guiding and spacing grooves engaging interior projections upon said item-segments.

76. In a computing-machine, the combination of a series of item-segments, a cradle therefor, means for setting up items upon said item-segments, means for locking said item-segments so as to prevent their relative movement, and a cam for positively moving said 77. In a computing-machine, the combination of a series of item devices, a series of numeral-keys, a manually-operated resetting means, and an interlock between said numeral-keys and said resetting means.

78. In a computing-machine, the combination of a series of numeral-keys, a series of item devices controlled thereby, a totalizing device, a manually-operated means for controlling said totalizing device, and an interlock between said item devices and said totalizing-key.

79. In a computing-machine, the combination of a series of rack-bars, a totalizing device, a manually-operated means for controlling said totalizing device, and an interlock between said rack-bars and said totalizing-key.

80. In a computing-machine, the combination of a controller for controlling the cycles of the machine by restraining and releasing the cycle-performing mechanism, a manually-operated totalizing-key, and an interlock between said controller and said totalizing-key preventing said controller from releasing the cycle-performing mechanism whenever the totalizing-key is in an intermediate position.

81. In a computing-machine, the combination of a controller for controlling the cycles of the machine by restraining and releasing the cycle-performing mechanism, a manually-operated totalizing-key, and an interlock between said controller and said totalizing-key acting to prevent the movement of the totalizing-key after the controller has been moved to release the cycle-performing mechanism so as to permit the performance of a cycle of the machine.

82. In a computing-machine the combination of a series of rack-bars, a series of totalizing devices, an alining device for said totalizing devices, a key for actuating said alining device, and an interlock between said rack-bars and said key.

83. In a computing-machine, the combination of a series of rack-bars, a series of totalizing devices, an alining device therefor, a series of total-printing devices, a means for bringing the same into operative relations with the totalizing devices, a key for operating said means and said alining devices.

84. In a computing-machine, the combination of a series of rack-bars, a series of totalizing devices, an alining device therefor, a series of total-printing devices, a means for bringing the same into operative relations with the totalizing devices, a key for operating said means and said alining devices, and an interlock between said key and said rack-bars.

85. In a computing-machine, the combination of a series of numeral-keys, a device for controlling the cycles of the machine, and an interlock between said device and said keys locking said device so long as a key is depressed.

86. In a computing-machine, the combination of a series of numeral-keys, a device for controlling the cycles of the machine, and an interlock between said device and said keys operating to prevent the operation of the cycle-controlling device when a key is depressed, but permitting the depression of a key during the cycle.

87. In a computing-machine, the combination of a series of accumulator-wheels, means for resetting the same, spring-impelled cycle-performing mechanism, a controller for determining cycles of said machine by restraining and releasing said cycle-performing mechanism and an interlock between said controller and said resetting means.

88. In a computing-machine, the combination of a selector for progressively shifting the line of operation of said machine, a series of operating numeral-keys acting to advance said selector step by step, and a device for locking said keys at the completion of a full throw of said selector.

89. In a computing-machine, means for setting up an item, accumulator-wheels, means for transferring said item to said accumulator-wheels by causing the machine to perform a cycle, a spring for causing said machine to perform a cycle when tripped, a lever for tripping said cycle-performing parts so as to permit said spring to act and for rewinding said spring by a single movement of said lever.

90. In a computing-machine, means for setting up an item, accumulator-wheels, means for transferring said item to said accumulator-wheels by causing the machine to perform a cycle, a spring for causing said machine to perform a cycle when tripped, means for tripping the cycle-performing parts so as to permit said spring to act, means for rewinding said spring during said cycle and means for preventing more than a single tripping before rewinding said spring.

91. In a computing-machine, means for setting up an item, accumulator-wheels, means for transferring said item to said accumulator-wheels by causing the machine to perform a cycle, a spring for causing said machine to perform a cycle when tripped, means for tripping said cycle-performing parts so as to permit said spring to act, means for rewinding said spring during said cycle and means for preventing the winding of said spring until after the tripping of said cycle-performing parts.

92. In a computing-machine, means for setting up an item, accumulator-wheels, means for transferring said item to said accumulator-wheels by causing the machine to perform a cycle, a spring for causing said machine to perform a cycle when tripped, means for tripping said cycle-performing parts so as to permit said spring to act, means for rewinding said spring during said cycle and means for preventing more than a single rewinding during that period.

93. In a computing-machine, the combination of a chain having a series of links constituting printing members, a wheel carrying said printing members and presenting them to the printing-line and a revolving platen having its axis parallel to said line.

94. In a computing-machine, the combination of a chain having a series of links having alternate printing-surfaces and indicating-surfaces, and means for taking an impression from any one of said printing-surfaces corresponding to the marking on one of the indicating-surfaces.

95. In a computing-machine, the combination of a chain having a series of links, each link having both a printing-surface and an indicating-surface so arranged that the printing and indicating surfaces of the chain alternate, and means for taking an impression from any one of said printing-surfaces corresponding to the marking on one of the indicating-surfaces.

96. In a computing-machine, the combination of wheels having type-faces, links having alternate type-faces and indicating-faces, and means for positioning the type-faces of the wheels and links in a line with each other and a rotating platen having its axis parallel thereto.

97. In a computing-machine, the combination of wheels having type-faces, links having type-faces, and means for positioning either the wheels or the links as desired in a given printing-line and a platen having its axis parallel thereto.

98. In a computing-machine, the combination of printing devices having separable links, and means for automatically moving the links to bring them out of printing position after the first impression is taken.

99. In a computing-machine, the combination of item-printing mechanism, accumulating mechanism, and additional printing devices having separable links, the item-printing devices being controlled for printing by the item-setting mechanism and the accumulating mechanism, and the additional printing devices being manually controlled independently thereof.

100. The combination with an adding-machine having suitable determining mechanisms, of keys capable of actuating said determining mechanisms, means for actuating the adding mechanism of the machine, and means whereby keys may be set during the operation of the adding-mechanism-actuating device.

101. In an adding-machine, keys, type-carriers, and mechanism for operating them to record numbers struck on the keys, and mechanism operable to receive a number struck on the keys before the type-carriers operated to record the previous number so struck, have returned to idle position.

102. In an adding-machine, the combination of registering devices for a plurality of denominations; a single group of keys; means operated by said keys for setting up digits in one denomination after another; means for operating the registering devices to add the number set up by the keys; and a lock for locking said keys after a number has been set up, said lock being released by said operating means.

103. In a machine for adding numbers in a plurality of denominations, the combination of a series of register-wheels; a single group of keys for all of the denominations; means whereby the depression of said keys one at a time sets up the digits of a number one at a time, said keys being operative to set up the digit in first one denomination and then in another; an operating device for operating the register-wheels after a number has been set up; and means for preventing a second operation of the setting-up device until said operating device has been operated.

Signed at New York, N. Y., this 8th day of June, 1904.

FRED M. CARROLL.

Witnesses:
    H. B. BROWNELL,
    L. VREELAND.